United States Patent
Okada et al.

(10) Patent No.: US 9,525,901 B2
(45) Date of Patent: Dec. 20, 2016

(54) DISTRIBUTION MANAGEMENT APPARATUS FOR DISTRIBUTING DATA CONTENT TO COMMUNICATION DEVICES, DISTRIBUTION SYSTEM, AND DISTRIBUTION MANAGEMENT METHOD

(71) Applicants: Atsushi Okada, Kanagawa (JP); Haruo Shida, Kanagawa (JP); Masaki Ninomiya, Kanagawa (JP); Yohsuke Kusumi, Aichi (JP)

(72) Inventors: Atsushi Okada, Kanagawa (JP); Haruo Shida, Kanagawa (JP); Masaki Ninomiya, Kanagawa (JP); Yohsuke Kusumi, Aichi (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/486,161

(22) Filed: Sep. 15, 2014

(65) Prior Publication Data
US 2015/0082365 A1 Mar. 19, 2015

(30) Foreign Application Priority Data
Sep. 17, 2013 (JP) .................................. 2013-191769

(51) Int. Cl.
*H04N 21/2662* (2011.01)
*G06F 3/14* (2006.01)
(Continued)

(52) U.S. Cl.
CPC ........ *H04N 21/2662* (2013.01); *G06F 3/1446* (2013.01); *H04N 21/25825* (2013.01);
(Continued)

(58) Field of Classification Search
CPC ............ H04N 21/4402; H04N 21/2662; H04N 21/1446; G06F 3/1446
See application file for complete search history.

(56) References Cited

U.S. PATENT DOCUMENTS 5,657,046 A * 8/1997 Noble .................. G06F 3/1446
345/1.3
5,712,655 A   1/1998 Noble et al.
(Continued)

FOREIGN PATENT DOCUMENTS

JP   2007-221229     8/2007
WO   WO-2011/124746 A1  10/2011
(Continued)

OTHER PUBLICATIONS

European Search Report dated Feb. 16, 2015 in corresponding Application No. 14184933.1.
(Continued)

*Primary Examiner* — Pinkal R Chokshi
*Assistant Examiner* — Frank Johnson-Calderon
(74) *Attorney, Agent, or Firm* — Harness, Dickey & Pierce, P.L.C.

(57) ABSTRACT

A distribution management apparatus includes an acquisition unit that acquires terminal management information that indicates locations of multiple communication terminals, a determination unit that determines cutout position information of video data based on the terminal management information acquired by the acquisition unit and operation data received from any one of the communication terminals, a cutout unit that cuts out multiple pieces of video data from the video data based on the cutout position information determined by the determination unit, and a distribution unit that distributes the video data cut out by the cutout unit to each of the communication terminals based on the terminal management information. The determination unit modifies the cutout position information of the video data based on the operation data.

6 Claims, 28 Drawing Sheets

(51) Int. Cl.
*H04N 21/4402* (2011.01)
*H04N 21/258* (2011.01)
*H04N 21/643* (2011.01)
*G09G 5/12* (2006.01)
*G09G 5/34* (2006.01)

(52) U.S. Cl.
CPC ... *H04N 21/4402* (2013.01); *H04N 21/64322* (2013.01); *G09G 5/12* (2013.01); *G09G 5/346* (2013.01); *G09G 2356/00* (2013.01)

(56) References Cited

U.S. PATENT DOCUMENTS

| | | | | |
|---|---|---|---|---|
| 5,923,307 | A * | 7/1999 | Hogle, IV | G06F 3/04897 345/1.3 |
| 7,242,369 | B2 * | 7/2007 | Huang | G06F 3/1423 345/1.1 |
| 9,213,365 | B2 * | 12/2015 | Sirpal | G06F 1/1616 |
| 2002/0071057 | A1 | 6/2002 | Kaneda et al. | |
| 2010/0045594 | A1 * | 2/2010 | Jenks | H04N 9/12 345/156 |
| 2010/0053164 | A1 * | 3/2010 | Imai | G06F 3/011 345/427 |
| 2010/0313150 | A1 * | 12/2010 | Morris et al. | 715/761 |
| 2011/0050544 | A1 | 3/2011 | Tomono | |
| 2011/0126113 | A1 * | 5/2011 | Sharma et al. | 715/738 |
| 2011/0229106 | A1 * | 9/2011 | Cho | 386/219 |
| 2011/0252317 | A1 | 10/2011 | Keränen et al. | |
| 2012/0062475 | A1 | 3/2012 | Locker et al. | |
| 2013/0076591 | A1 | 3/2013 | Sirpal et al. | |
| 2013/0076595 | A1 | 3/2013 | Sirpal et al. | |
| 2013/0076596 | A1 | 3/2013 | de Paz et al. | |
| 2013/0076597 | A1 | 3/2013 | Becze | |
| 2013/0076598 | A1 | 3/2013 | Sirpal et al. | |
| 2013/0076632 | A1 | 3/2013 | Sirpal et al. | |
| 2013/0076637 | A1 | 3/2013 | Teltz | |
| 2013/0076638 | A1 | 3/2013 | Sirpal et al. | |
| 2013/0076653 | A1 | 3/2013 | Selim | |
| 2013/0076654 | A1 | 3/2013 | Sirpal et al. | |
| 2013/0076655 | A1 | 3/2013 | Sirpal et al. | |
| 2013/0076656 | A1 | 3/2013 | Sirpal et al. | |
| 2013/0076657 | A1 | 3/2013 | Reeves et al. | |
| 2013/0076658 | A1 | 3/2013 | Cassar et al. | |
| 2013/0076660 | A1 | 3/2013 | Reeves et al. | |
| 2013/0076661 | A1 | 3/2013 | Reeves et al. | |
| 2013/0076662 | A1 | 3/2013 | Sirpal et al. | |
| 2013/0076663 | A1 | 3/2013 | Sirpal et al. | |
| 2013/0076664 | A1 | 3/2013 | Reeves et al. | |
| 2013/0076665 | A1 | 3/2013 | Reeves et al. | |
| 2013/0076672 | A1 | 3/2013 | Sirpal et al. | |
| 2013/0076673 | A1 | 3/2013 | Sirpal et al. | |
| 2013/0076677 | A1 | 3/2013 | Kretz | |
| 2013/0076678 | A1 | 3/2013 | Kretz | |
| 2013/0076679 | A1 | 3/2013 | Kretz | |
| 2013/0076680 | A1 | 3/2013 | Jouin | |
| 2013/0076681 | A1 | 3/2013 | Sirpal et al. | |
| 2013/0076682 | A1 | 3/2013 | de Paz et al. | |
| 2013/0076683 | A1 | 3/2013 | Reeves | |
| 2013/0076715 | A1 | 3/2013 | Selim | |
| 2013/0076718 | A1 | 3/2013 | Sirpal et al. | |
| 2013/0076780 | A1 | 3/2013 | Reeves et al. | |
| 2013/0076781 | A1 | 3/2013 | Sirpal et al. | |
| 2013/0076782 | A1 | 3/2013 | Sirpal et al. | |
| 2013/0076793 | A1 | 3/2013 | Sirpal et al. | |
| 2013/0076795 | A1 | 3/2013 | Sirpal et al. | |
| 2013/0076929 | A1 | 3/2013 | Sirpal et al. | |
| 2013/0076961 | A1 | 3/2013 | Sirpal | |
| 2013/0076963 | A1 | 3/2013 | Sirpal et al. | |
| 2013/0076964 | A1 | 3/2013 | Sirpal et al. | |
| 2013/0077221 | A1 | 3/2013 | Becze et al. | |
| 2013/0077236 | A1 | 3/2013 | Becze et al. | |
| 2013/0077260 | A1 | 3/2013 | Sirpal et al. | |
| 2013/0078959 | A1 | 3/2013 | Reeves et al. | |
| 2013/0078994 | A1 | 3/2013 | Jouin | |
| 2013/0078995 | A1 | 3/2013 | Jouin | |
| 2013/0079054 | A1 | 3/2013 | Jouin | |
| 2013/0079055 | A1 | 3/2013 | Jouin | |
| 2013/0079062 | A1 | 3/2013 | Sirpal et al. | |
| 2013/0079063 | A1 | 3/2013 | Jouin | |
| 2013/0080759 | A1 | 3/2013 | Reeves et al. | |
| 2013/0080929 | A1 | 3/2013 | Sirpal et al. | |
| 2013/0080931 | A1 | 3/2013 | Sirpal et al. | |
| 2013/0080932 | A1 | 3/2013 | Sirpal et al. | |
| 2013/0080933 | A1 | 3/2013 | Reeves et al. | |
| 2013/0080934 | A1 | 3/2013 | Reeves et al. | |
| 2013/0080935 | A1 | 3/2013 | Reeves et al. | |
| 2013/0080936 | A1 | 3/2013 | Reeves et al. | |
| 2013/0080937 | A1 | 3/2013 | Sirpal et al. | |
| 2013/0080938 | A1 | 3/2013 | Reeves et al. | |
| 2013/0080939 | A1 | 3/2013 | Reeves et al. | |
| 2013/0080945 | A1 | 3/2013 | Reeves | |
| 2013/0080956 | A1 | 3/2013 | Sirpal et al. | |
| 2013/0080957 | A1 | 3/2013 | Sirpal et al. | |
| 2013/0080958 | A1 | 3/2013 | Sirpal et al. | |
| 2013/0080970 | A1 | 3/2013 | Sirpal et al. | |
| 2013/0082585 | A1 | 4/2013 | Becze et al. | |
| 2013/0082955 | A1 | 4/2013 | Becze et al. | |
| 2013/0082957 | A1 | 4/2013 | Reeves et al. | |
| 2013/0082958 | A1 | 4/2013 | Reeves et al. | |
| 2013/0083242 | A1 | 4/2013 | Sirpal et al. | |
| 2013/0083464 | A1 | 4/2013 | Becze et al. | |
| 2013/0083466 | A1 | 4/2013 | Becze et al. | |
| 2013/0083467 | A1 | 4/2013 | Becze | |
| 2013/0083468 | A1 | 4/2013 | Becze et al. | |
| 2013/0083469 | A1 | 4/2013 | Becze et al. | |
| 2013/0083470 | A1 | 4/2013 | Becze et al. | |
| 2013/0083477 | A1 | 4/2013 | Becze et al. | |
| 2013/0083558 | A1 | 4/2013 | Becze | |
| 2013/0086480 | A1 | 4/2013 | Sirpal et al. | |
| 2013/0086492 | A1 | 4/2013 | Sirpal et al. | |
| 2013/0086493 | A1 | 4/2013 | Reeves et al. | |
| 2013/0086494 | A1 | 4/2013 | Sirpal et al. | |
| 2013/0086505 | A1 | 4/2013 | de Paz et al. | |
| 2013/0088411 | A1 | 4/2013 | Reeves et al. | |
| 2013/0088446 | A1 | 4/2013 | Sirpal et al. | |
| 2013/0088447 | A1 | 4/2013 | Becze | |
| 2013/0091439 | A1 | 4/2013 | Sirpal et al. | |
| 2013/0097532 | A1 | 4/2013 | Reeves et al. | |
| 2013/0100001 | A1 | 4/2013 | Reeves et al. | |
| 2013/0113835 | A1 | 5/2013 | Sirpal et al. | |
| 2013/0135346 | A1 | 5/2013 | Sakuramata et al. | |
| 2013/0176255 | A1 * | 7/2013 | Kim | G06F 3/1423 345/173 |
| 2013/0187831 | A1 | 7/2013 | Sirpal et al. | |
| 2013/0214995 | A1 * | 8/2013 | Lewin et al. | 345/1.3 |
| 2013/0219162 | A1 | 8/2013 | Reeves et al. | |
| 2013/0222266 | A1 * | 8/2013 | Gardenfors | G06F 3/1446 345/173 |
| 2013/0266065 | A1 * | 10/2013 | Paczkowski | H04N 19/00769 375/240.12 |
| 2014/0009366 | A1 * | 1/2014 | Chang | 345/1.1 |
| 2014/0104139 | A1 * | 4/2014 | Buchner | G06F 3/1446 345/1.3 |
| 2014/0194066 | A1 * | 7/2014 | Li | G06F 3/1446 455/41.3 |
| 2014/0310611 | A1 | 10/2014 | Lewin et al. | |
| 2014/0331141 | A1 * | 11/2014 | Tijssen | G06F 3/04883 715/738 |
| 2015/0009237 | A1 | 1/2015 | Sirpal et al. | |
| 2015/0067521 | A1 * | 3/2015 | Heo | G06F 3/1446 715/733 |

FOREIGN PATENT DOCUMENTS

| | | |
|---|---|---|
| WO | WO-2014142342 A1 | 9/2014 |
| WO | WO-2014142343 A1 | 9/2014 |
| WO | WO-2014142354 A1 | 9/2014 |
| WO | WO-2014142358 A1 | 9/2014 |

OTHER PUBLICATIONS

U.S. Appl. No. 14/208,213, filed Mar. 13, 2014.
U.S. Appl. No. 14/204,040, filed Mar. 11, 2014.

(56) References Cited

OTHER PUBLICATIONS

U.S. Appl. No. 14/208,830, filed Mar. 13, 2014.
U.S. Appl. No. 14/207,788, filed Mar. 13, 2014.
U.S. Appl. No. 14/205,497, filed Mar. 12, 2014.
U.S. Appl. No. 14/207,800, filed Mar. 13, 2014.
U.S. Appl. No. 14/207,764, filed Mar. 13, 2014.
U.S. Appl. No. 14/204,531, filed Mar. 11, 2014.
U.S. Appl. No. 14/205,710, filed Mar. 12, 2014.

* cited by examiner

FIG. 12

DISTRIBUTION DESTINATION
SELECTION MENU

CHECK ANY CONTENT DISTRIBUTION
DESTINATION AND PRESS "OK"

| CHECK | SHARED ID | DISPLAY NAME |
|---|---|---|
|  | v003 | TOKYO HEAD OFFICE 10F MFP |
| ✓ | v006 | OSAKA EXHIBITION HALL 1F MULTIDISPLAY |
| ⋮ | ⋮ | ⋮ |

OK    CANCEL

FIG. 13A

| TERMINAL ID | USER CERTIFICATE | CONTRACT INFORMATION | TERMINAL TYPE | SETTING INFORMATION (HOME URL) | EXECUTION ENVIRONMENT INFORMATION (FAVORITES) (PREVIOUS COOKIE INFORMATION) (CACHE FILE) | SHARED ID | INSTALLATION POSITION | DISPLAY NAME |
|---|---|---|---|---|---|---|---|---|
| t001 | ...... | FHD, 30 FPS, 3-MONTH CONTRACT | NOTEBOOK PC | http://www.rocoh.co.jp | ...... | v001 | — | BEIJING OFFICE 10F RECEPTION TERMINAL |
| t002 | ...... | HD, 30 FPS, 3-MONTH CONTRACT | TABLET TERMINAL | http://www.rocoh.co.jp | ...... | v002 | — | NEW YORK OFFICE 1F LOBBY RECEPTION TERMINAL |
| t003 | ...... | QVGA, 15 FPS, 6 MONTHS | MFP | http://www.rocoh.co.jp | ...... | v003 | — | TOKYO HEAD OFFICE 10F MFP |
| t004 | ...... | WXGA, 15 FPS, 12 MONTHS | PROJECTOR | http://www.pontax.co.jp | ...... | v004 | — | TOKYO HEAD OFFICE 1F LOBBY PROJECTOR |
| t005 | ...... | WXGA, 15 FPS, 6 MONTHS | CAMERA/MICROPHONE/SPEAKER | — | — | v005 | — | NAGOYA BRANCH OFFICE 2F TV CONFERENCE ROOM TERMINAL |
| t006 | ...... | FHD, 30 FPS, 12-MONTH CONTRACT | MULTI-DISPLAY | — | — | v006 | LEFT | OSAKA EXHIBITION HALL 1F MULTI-DISPLAY |

FIG. 13B

| t007 | ...... | FHD, 30 FPS, 12-MONTH CONTRACT | MULTI-DISPLAY | - | - | v006 | MIDDLE | OSAKA EXHIBITION HALL 1F MULTI-DISPLAY |
| t008 | ...... | FHD, 30 FPS, 12-MONTH CONTRACT | MULTI-DISPLAY | - | - | v006 | RIGHT | OSAKA EXHIBITION HALL 1F MULTI-DISPLAY |
| ... | ... | ... | ... | ... | ... | ... | ... | ... |

FIG. 14
| TERMINAL ID | SHARED ID |
|---|---|
| t001 | v003 |
| t001 | v006 |
| t002 | v001 |
| ⋮ | ⋮ |
FIG. 15
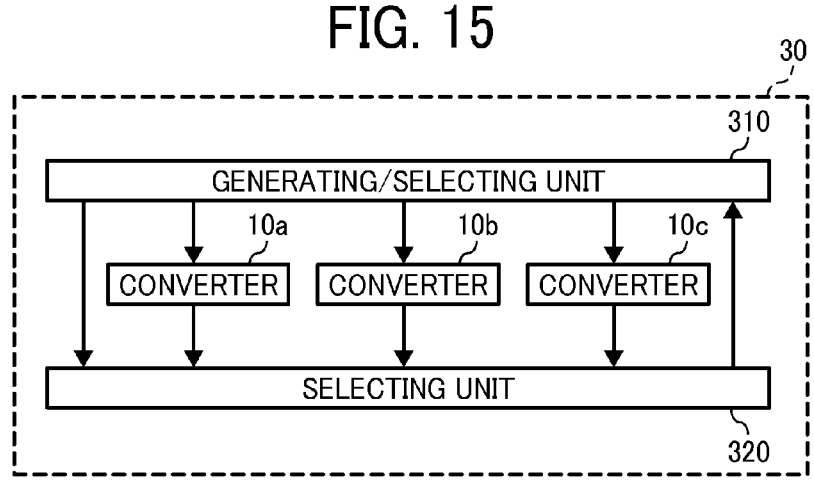
FIG. 16
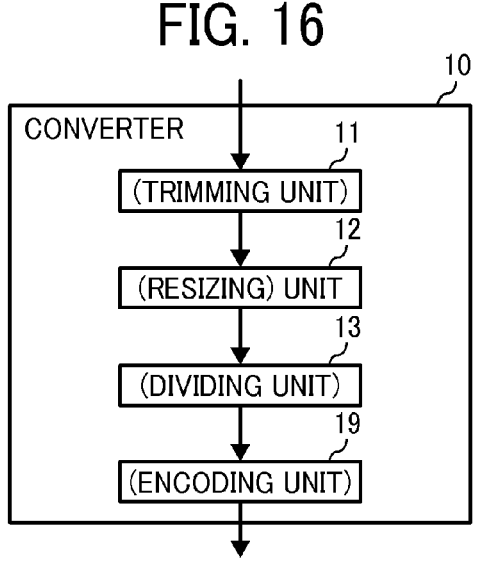

CONTENT DATA
FROM WEB SERVER

IMAGES ON DISPLAYED ON
COMMUNICATION TERMINALS
(BEFORE SCROLLING, TURNING PAGE)

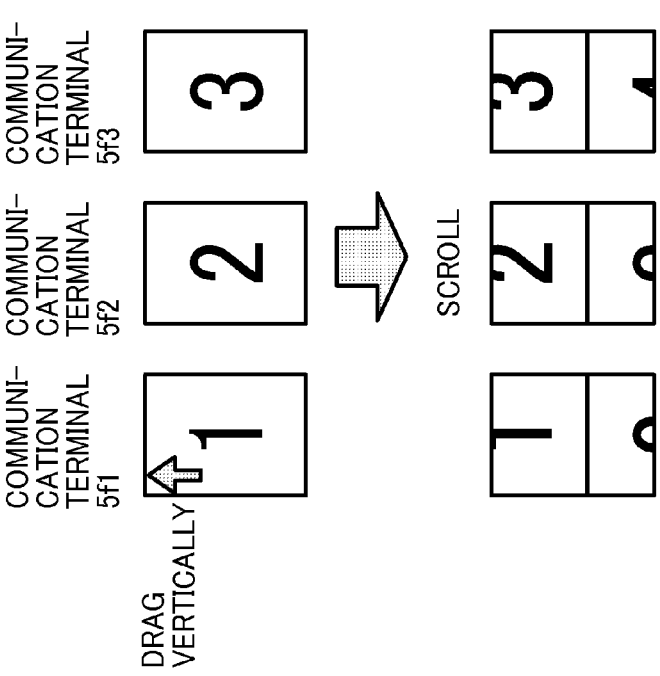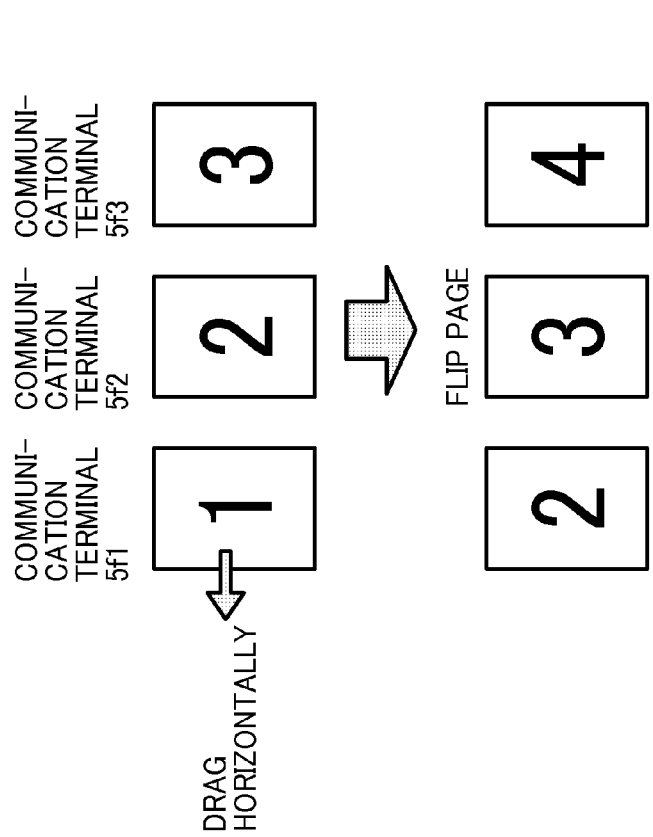

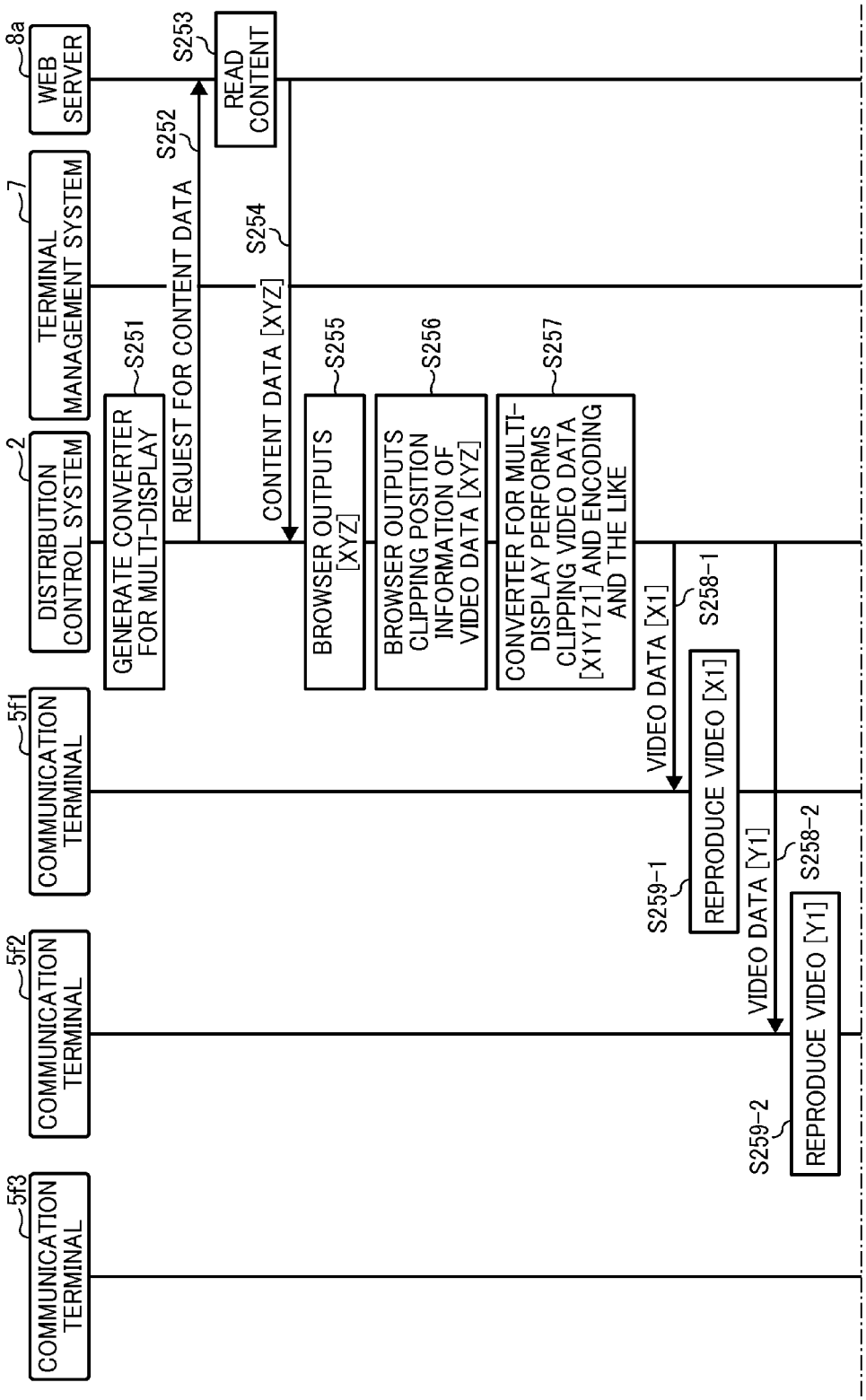

DISTRIBUTION MANAGEMENT APPARATUS FOR DISTRIBUTING DATA CONTENT TO COMMUNICATION DEVICES, DISTRIBUTION SYSTEM, AND DISTRIBUTION MANAGEMENT METHOD

CROSS-REFERENCE TO RELATED APPLICATION

This patent application is based on and claims priority pursuant to 35 U.S.C. §119 to Japanese Patent Application No. 2013-191769, filed on Sep. 17, 2013 in the Japan Patent Office, the entire disclosure of which is hereby incorporated by reference herein.

BACKGROUND

Technical Field

The present invention relates to a distribution management apparatus, a distribution system and a distribution management method.

Background Art

With the recent spread of the Internet, cloud computing has come to be used in various fields. In one example, the cloud computing provides a service usage pattern in which users pay to use service (cloud service) provided by a server on the Internet using a communication terminal connected to the Internet.

In cloud services, web content is distributed to multiple communication terminals. For example, a distribution system that distributes web content to each of multiple communication terminals is well known.

SUMMARY

An example embodiment of the present invention provides a novel distribution management apparatus that includes an acquisition unit that acquires terminal management information that indicates locations of multiple communication terminals, a determination unit that determines cutout position information of video data based on the terminal management information acquired by the acquisition unit and operation data received from any one of the communication terminals, a cutout unit that cuts out multiple pieces of video data from the video data based on the cutout position information determined by the determination unit, and a distribution unit that distributes the video data cut out by the cutout unit to each of the communication terminals based on the terminal management information. The determination unit modifies the cutout position information of the video data based on the operation data.

Further example embodiments of the present invention provide a distribution management method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 12 is a conceptual view of a distribution destination selection menu screen as an embodiment of the present invention.

FIGS. 13A and 13B are conceptual views of a terminal management table as an embodiment of the present invention.

FIG. 14 is a conceptual view of an available terminal management table as an embodiment of the present invention.

FIG. 15 is a detailed diagram of an encoder bridge unit as an embodiment of the present invention.

FIG. 16 is a functional block diagram illustrating the functions of a converter as an embodiment of the present invention.

FIG. 26A is a diagram illustrating display images on the communication terminals before dragging, and FIG. 26B is a diagram illustrating display images on the communication terminals after dragging.

FIGS. 29A and 29B are sequence diagrams illustrating a process of controlling multiple displays.

DETAILED DESCRIPTION

Figure 1:
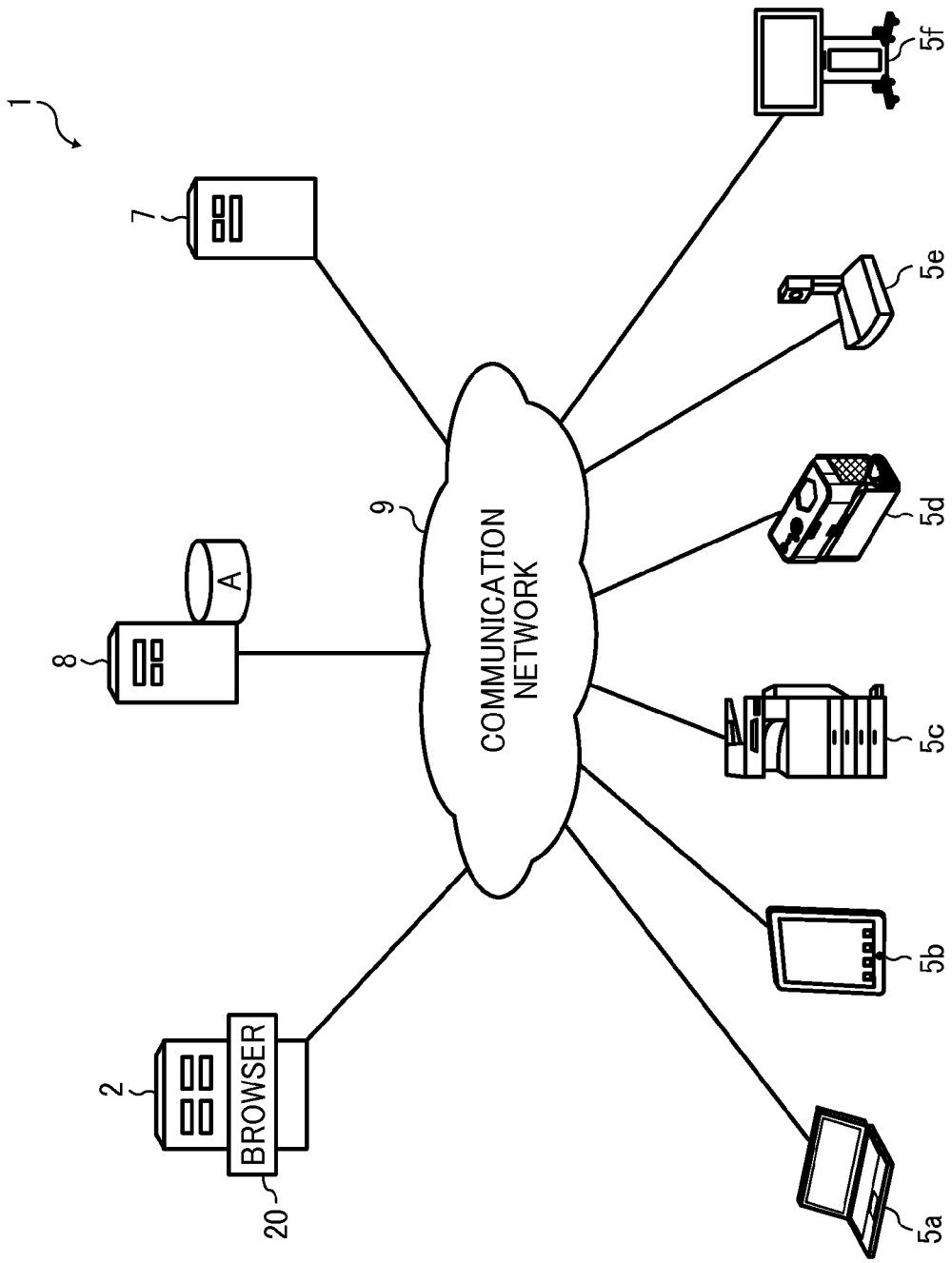
FIG. 1 is a schematic diagram of a distribution system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Recently, content may be displayed, as if the content is displayed on one large screen by dividing the content into multiple pieces and displaying them on multiple terminals. If only a part of the web content is displayed on one communication terminal, it is desirable to be able to browse hidden web content using a display control command for example.

In such case, while scrolling a display or turning a page on a terminal by operating another terminal, it is preferable to change displays on multiple display terminals en bloc.

In the following embodiment, in a distribution management apparatus and distribution system that divide content into pieces and display them on multiple terminals, it is possible to change displays on the multiple terminals en bloc by operating any terminal.

In the following embodiment, a distribution system that converts the web content into video data and sound data using the cloud computing and distributes them to the communication terminals such as personal computers (PCs) and electronic whiteboards.

A case indicating at least either one of video and a sound is represented as a "video (sound)" below.

FIG. 1 is a schematic diagram of a distribution system in this embodiment.

Described first is an outline of the configuration of the distribution system 1.

As illustrated in FIG. 1, the distribution system 1 according to the present embodiment is constructed by a distribution management system 2, a plurality of communication terminals (from 5a to 5f), a terminal management system 7, and a web server 8. In the following, any communication terminal among the communication terminals (from 5a to 5f) is represented as a "communication terminal 5". The distribution management system 2, the terminal management system 7, and the web server 8 are all constructed by server computers.

The communication terminal 5 is a terminal used by a user who receives services of the distribution system 1. The communication terminal 5a is a notebook personal computer (PC). The communication terminal 5b is a mobile terminal such as a smartphone and a tablet terminal. The communication terminal 5c is a multifunction peripheral/printer/product (MFP) in which the functions of copying, scanning, printing, and faxing are combined. The communication terminal 5d is a projector. The communication terminal 5e is a TV (video) conference terminal having a camera, a microphone, and a speaker. The communication terminal 5f is an electronic blackboard (whiteboard) capable of electronically converting drawings drawn by a user or the like.

The communication terminal 5 is not only such terminals as illustrated in FIG. 1, but also may be devices communicable through a communication network such as the Internet, including a watch, a vending machine, a car navigation device, a game machine, an air conditioner, a lighting fixture, a camera alone, a microphone alone, and a speaker alone.

The distribution management system 2, the communication terminal 5, the terminal management system 7, and the web server 8 can communicate with each other through a communication network 9 such as the Internet and a local area network (LAN). The communication network 9 includes wireless communication networks such as 3rd Generation (3G), Worldwide Interoperability for Microwave Access (WiMAX), and Long-Term Evolution (LTE).

Figure 2:
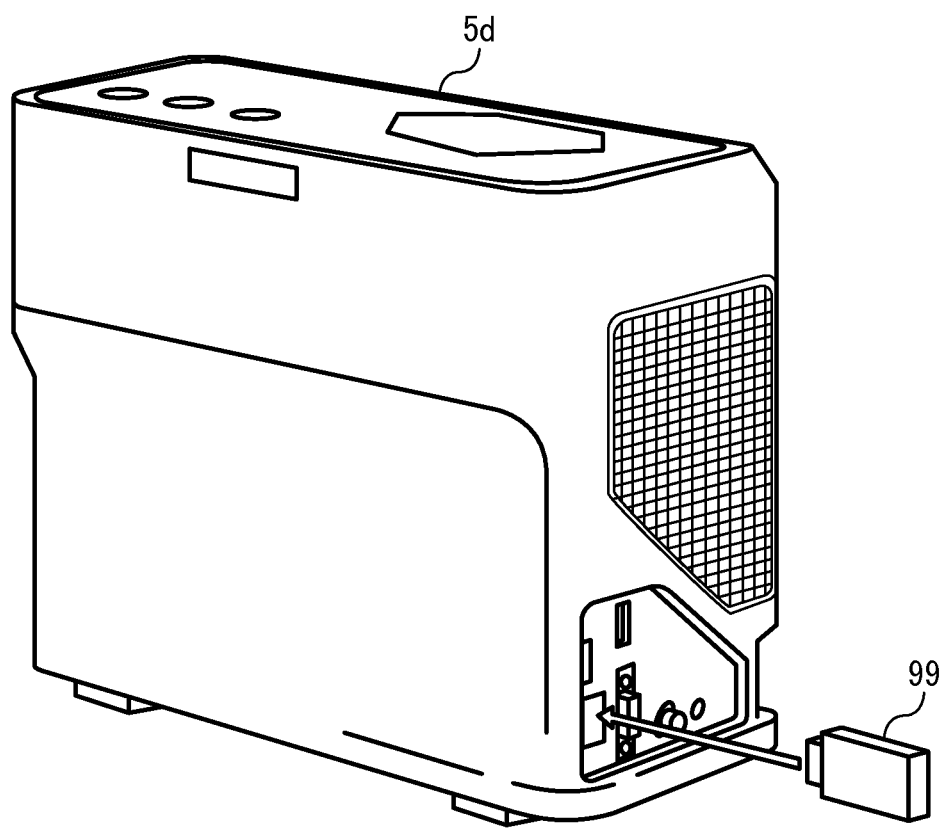
FIG. 2 is a conceptual showing a dongle attached to a communication terminal as an embodiment of the present invention.

The communication terminal 5, like the communication terminal 5d, may not have a function of communicating with the other terminals and systems through the communication network 9. However, as illustrated in FIG. 2, a user inserts a dongle 99 into an interface of Universal Serial Bus (USB) or High-Definition Multimedia Interface (HDMI) of the communication terminal 5d, thereby allowing it to communicate with the other terminals and systems. FIG. 2 is a conceptual view showing the dongle attached to the communication terminal.

The distribution management system 2 has a browser 20 on a cloud, acquires video (sound) data such as H.264 and MPEG-4 using the function of rendering in the browser 20, and distributes the acquired video (sound) data to the communication terminal 5.

The terminal management system 7 performs login authentication on the communication terminal 5 and manages the contract information and the like of the communication terminal 5. The terminal management system 7 is a Simple Mail Transfer Protocol (SMTP) server for transmitting e-mails. The terminal management system 7 can be embodied as, for example, an imaginary machine developed on a cloud service (IaaS: Infrastructure as a Service). It is desirable that the terminal management system 7 be operated in a multiplexed manner in order to address unexpected incidents to provide uninterrupted service.

The browser 20 enables real-time communication/collaboration (RTC). The distribution management system 2 has the encoding unit 19 in FIG. 16 described below, and the encoding unit 19 can perform real-time encoding on the frame data output by the browser 20 and output video (sound) data generated through conversion based on the H.264 standards or the like. As a result, the processing of the distribution management system 2 is different from, for example, a case in which non real-time video (sound) data recorded in a DVD is read and distributed by a DVD player.

Described next is an outline of various kinds of distribution methods.

Basic Distribution

Figure 3:
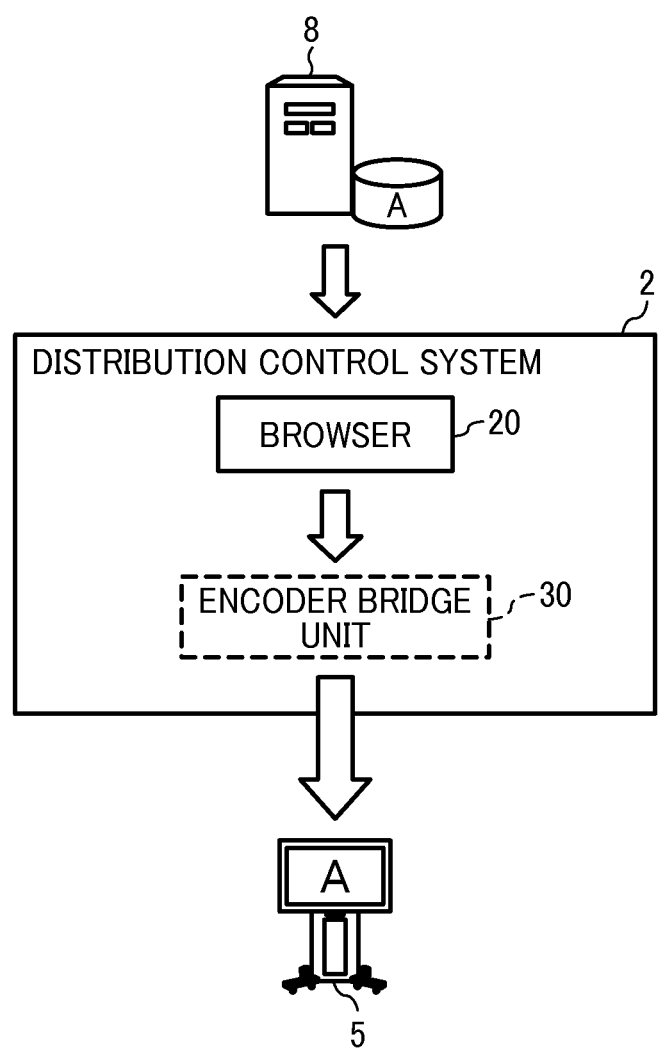
FIG. 3 is a conceptual diagram illustrating a basic distribution method as an embodiment of the present invention.

FIG. 3 is a conceptual diagram illustrating a basic distribution method. In the distribution system 1, as illustrated in FIG. 3, the browser 20 of the distribution management system 2 acquires web content data [A] from the web server 8 and renders it, thereby generating video (sound) data [A]. An encoder bridge unit 30 including the encoding unit 19 performs encoding and the like on the video (sound) data [A] and distributes it to the communication terminal 5. Thus, the distribution management system 2 can distribute even rich web content data to the communication terminal 5 while converting it from the web content data in HTML or the like into the compressed video (sound) data in H.264 or the like on the cloud. As a result, the web content can be smoothly reproduced on the communication terminal 5 side without time and effort and cost for improving the performance of a central processing unit (CPU), an operating system (OS), and the like.

In the distribution management system 2 in this embodiment, it is possible to reproduce the latest rich web content smoothly by updating the browser 20 without updating the browser that provides content to the local communication terminal 5.

Figure 4:
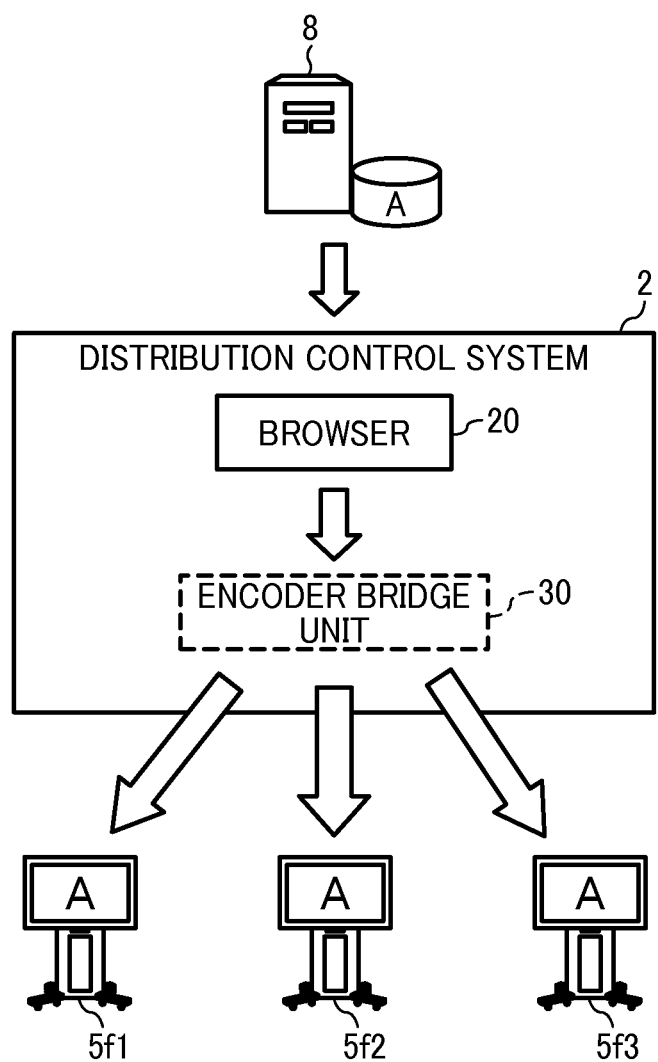
FIG. 4 is a conceptual diagram of multicast as an embodiment of the present invention.
Figure 5:
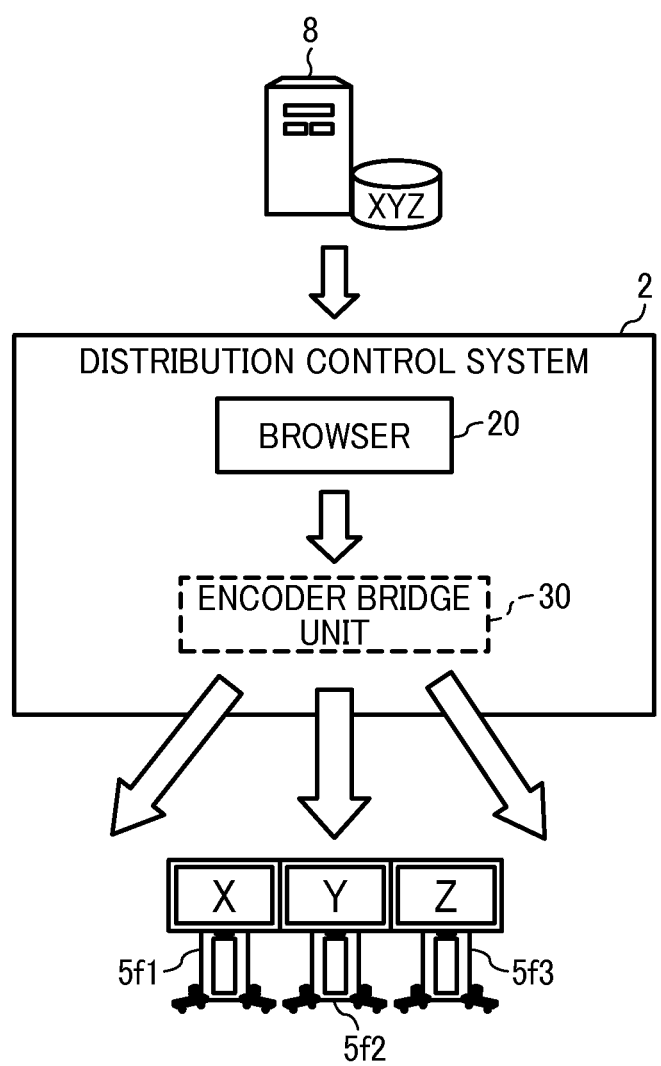
FIG. 5 is a conceptual diagram of multi-display as an embodiment of the present invention.
Figure 6:
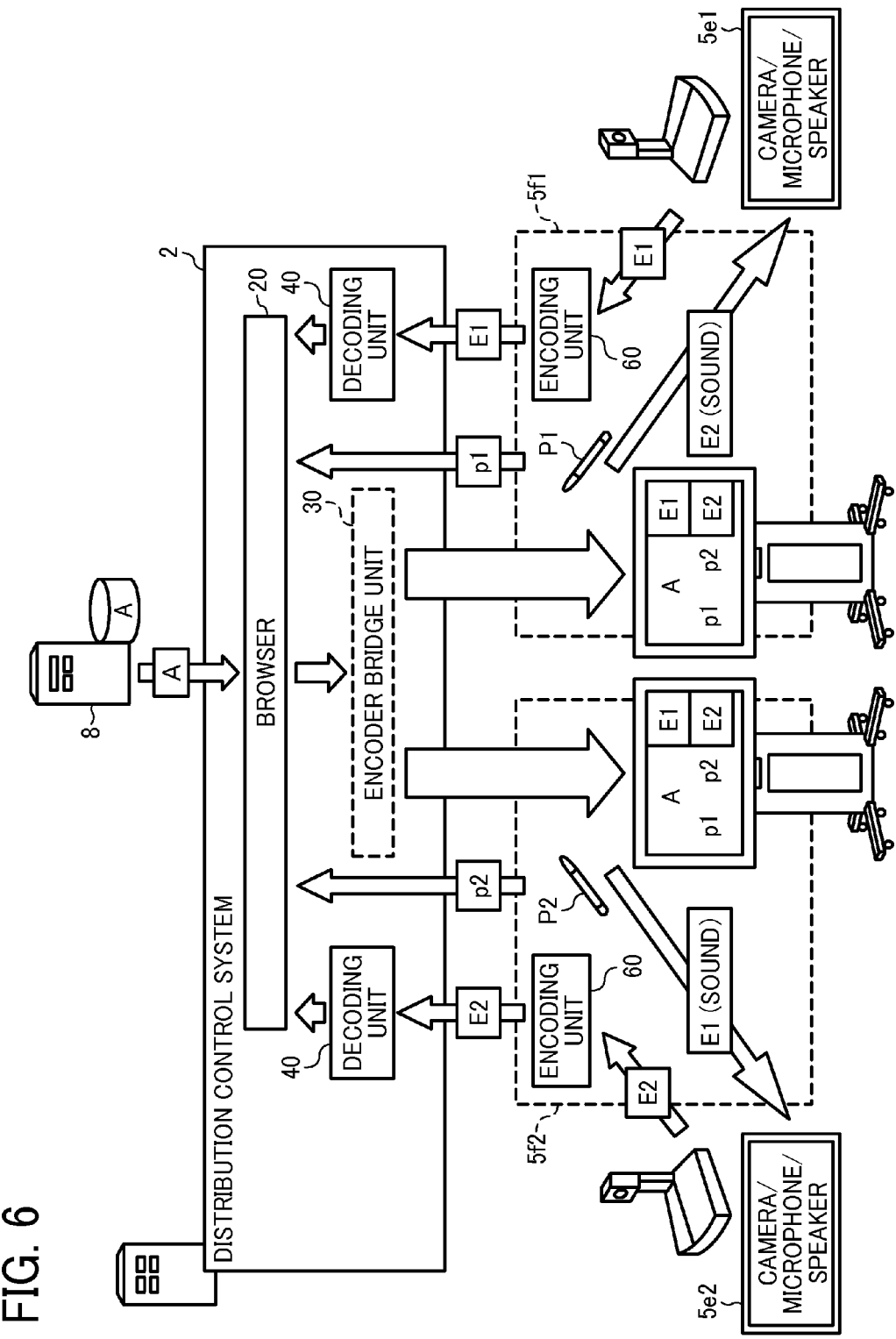
FIG. 6 is a conceptual diagram of composite distribution using a plurality of communication terminals through a distribution management system as an embodiment of the present invention.

Applying the above distribution method, as illustrated in FIG. 4 to FIG. 6, the distribution system 1 also can distribute web content data to a plurality of sites as video (sound) data. Described here are distribution methods illustrated in FIG. 4 to FIG. 6.

Multicast

FIG. 4 is a conceptual diagram of multicast. As illustrated in FIG. 4, the single browser 20 of the distribution management system 2 acquires the web content data [A] as video (sound) data from the web server 8 and renders it. The encoder bridge unit 30 encodes the video (sound) data [A]. The distribution management system 2 then distributes the video (sound) data [A] to a plurality of communication terminals (5/1, 5/2, and 5/3).

Thus, the same video (sound) is reproduced at the sites. In this case, the communication terminals (5/1, 5/2, and 5/3) do not need to have the same display reproduction capability (e.g., the same resolution). The distribution method like this is called, for example, "multicast".

Multi-Display

FIG. 5 is a conceptual diagram of multi-display. As illustrated in FIG. 5, the single browser 20 of the distribution management system 2 acquires web content data [XYZ] from the web server 8 and renders it, thereby generating single piece of video (sound) data [XYZ]. For the single piece of video (sound) data [XYZ], the encoder bridge unit 30 divides it into a plurality of pieces of video (sound) data ([X], [Y], and [Z]) and then encodes them. The distribution management system 2 then distributes the video (sound) data [X] to the communication terminal 5/1. Similarly, the distribution management system 2 distributes the video (sound) data [Y] to the communication terminal 5/2 and distributes the video (sound) data [Z] to the communication terminal 5/3. Thus, for example, even for landscape web content [XYZ], video (sound) is reproduced by the communication terminals 5 in a divided manner. As a result, when the communication terminals (5/1, 5/2, and 5/3) are installed in a line, the same effect as the reproduction of one piece of large video can be obtained. In this case, the communication terminals (5/1, 5/2, and 5/3) need to have the same display reproduction capability (e.g., the same resolution). The distribution method like this is called, for example, "multi-display".

Composite Distribution

FIG. 6 is a conceptual diagram of composite distribution using a plurality of communication terminals through a distribution management system. As illustrated in FIG. 6, at a first site (the right side in FIG. 6), the communication terminal 5/1 as an electronic blackboard and a communication terminal 5e1 as a TV conference terminal are used, and at a second site (the left side in FIG. 6), the communication terminal 5/2 as an electronic blackboard and a communication terminal 5e2 as a TV conference terminal are similarly used. At the first site, an electronic pen P1 is used for drawing characters and the like with strokes on the communication terminal 5/1. At the second site, an electronic pen P2 is used for drawing characters and the like with strokes on the communication terminal 5/2.

At the first site, video (sound) data acquired by the communication terminal 5e1 is encoded by an encoding unit 60 and is then transmitted to the distribution management system 2. After that, it is decoded by a decoding unit 40 of the distribution management system 2 and is then input to the browser 20. Operation data indicating the strokes drawn by the communication terminal 5/1 with the electronic pen P1 (in this case, coordinate data on the display of the communication terminal 5/1 or the like) is transmitted to the distribution management system 2 to be input to the browser 20. Also at the second site, video (sound) data acquired by the communication terminal 5e2 is encoded by the encoding unit 60 and is then transmitted to the distribution management system 2. After that, it is decoded by the decoding unit 40 of the distribution management system 2 and is then input to the browser 20. Operation data indicating the strokes drawn by the communication terminal 5/2 with the electronic pen P2 (in this case, coordinate data on the display of the communication terminal 5/2 or the like) is transmitted to the distribution management system 2 to be input to the browser 20.

The browser 20 acquires, for example, web content data [A] as a background image displayed on the respective displays of the communication terminals (5/1, 5/2) from the web server 8. The browser 20 combines the web content data [A], operation data ([p1], [p2]), and video (sound) content data ([E1], [E2]) and renders them, thereby generating pieces of frame data as pieces of still image (sound) data in which the respective pieces of content data ([A], [p1], [p2], [E1], [E2]) are arranged with a desired layout. The encoder bridge unit 30 encodes the pieces of frame data, and the distribution management system 2 distributes video (sound) data indicating the same content ([U], [p1], [p2], [E1], [E2]) to both sites. At the first site, thereby, video ([A], [p1], [p2], [E1 (video part)] and [E2 (video part)] are displayed on the display of the communication terminal 5/1, and a sound [E2 (sound part)] is output from the speaker of the communication terminal 5e1. Also at the second site, video ([A], [p1], [p2], [E1 (video part)] and [E2 (video part)] are displayed on the display of the communication terminal 5/2, and a sound [E1 (sound part)] is output from the speaker of the communication terminal 5e2. At the first site, the sound of the site itself [E1 (sound part)] is not output owing to an echo cancelling function of the communication terminal 5/1. At the second site, the sound of the site itself [E2 (sound part)] is not output owing to an echo cancelling function of the communication terminal 5/2.

Thus, at the first site and the second site, remote shared processing can be performed that shares the same information in real time at remote sites, thus making the distribution system 1 according to the present embodiment effective in a teleconference or the like.

Detailed Description of the Embodiment

Described in detail next with reference to FIG. 7 to FIG. 24 is the embodiment.

Hardware Configuration of the Embodiment

Figure 7:
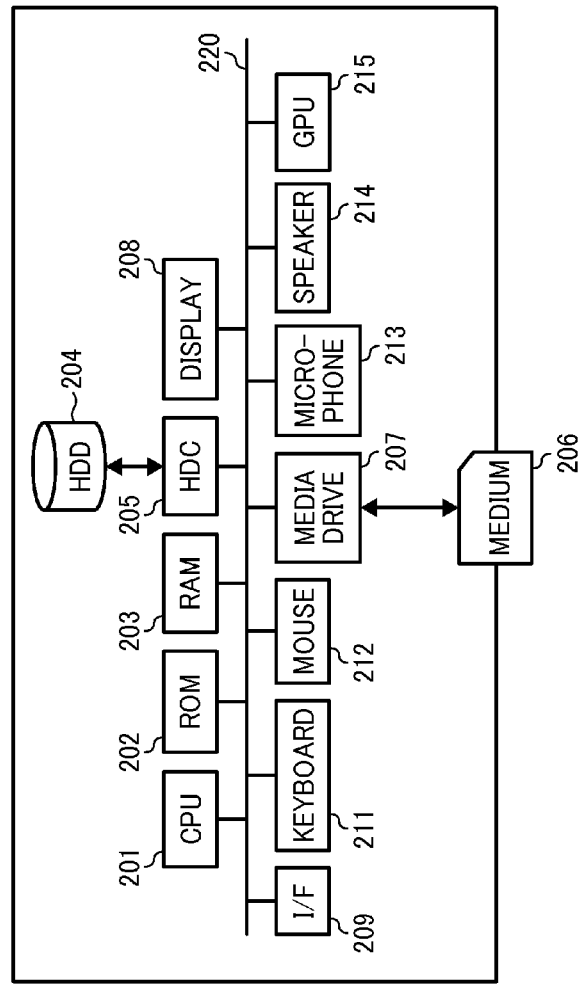
FIG. 7 is a hardware configuration diagram of a distribution management system, a communication terminal, a terminal management system, and a web server as an embodiment of the present invention.
Figure 8:
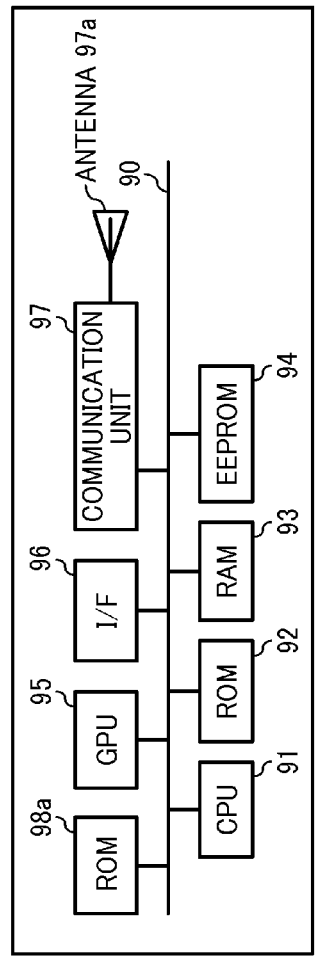
FIG. 8 is a hardware configuration diagram of the dongle as an embodiment of the present invention.

Described first with reference to FIG. 7 and FIG. 8 is the hardware configuration of the present embodiment. FIG. 7 is a hardware configuration diagram of a distribution management system, a communication terminal, a terminal management system, and a web server. FIG. 8 is a hardware configuration diagram of a dongle. Because a hardware configuration relating to the communication of the communication terminal is the same as part of the hardware configuration of the communication terminal, the description thereof will be omitted.

As illustrated in FIG. 7, the distribution management system 2 includes: a (host) CPU 201 that controls the entire operation of the distribution management system 2; a ROM 202 that stores a program used for driving the CPU 201 such as IPL; a RAM 203 used as a work area of the CPU 201; an HDD 204 that stores various kinds of data such as programs; a hard disk controller (HDC) 205 that controls the reading and writing the various kinds of data from and into the HDD 204 under the control of the CPU 201; a media drive 207 that controls the reading and writing data from and into a storage medium 206 such as a flash memory; a display 208 that displays various kinds of information; an I/F 209 for transmitting data using the communication network 9 and connecting the dongle 99; a keyboard 211; a mouse 212; a microphone 213, a speaker 214, a graphics processing unit ((GPU) 215; a ROM 216 that stores a program used for driving the GPU 215; a RAM 217 used as a work area of the GPU 215; and a bus line 220 such as an address bus and a data bus for electrically connecting the above components as illustrated in FIG. 7.

It is possible to distribute programs for the communication terminals, systems, and servers being stored in computer-readable storage media such as the storage medium 206 described above in format of installable files or executable files.

Described next with reference to FIG. 8 is the hardware configuration of the dongle illustrated in FIG. 2. As illustrated in FIG. 8, the dongle 99 includes: a CPU 91 that controls the entire operation of the dongle 99; a ROM 92 that stores a basic input/output program; a RAM 93 used as a work area of the CPU 91; an electrically erasable and programmable ROM (EEPROM) 94 that performs the reading and writing of data under the control of the CPU 91; a GPU 95; an interface I/F 96 for being connected to the interface I/F 209 of the communication terminal 5; an antenna 97a; a communication unit 97 that performs communications by a short-distance wireless technology using the antenna 97a; and a bus line 90 such as an address bus and a data bus for electrically connecting the above units. Examples of the short-distance wireless technology include the near field communication (NFC) standards, Bluetooth (registered trademark), wireless fidelity (Wi-Fi), and Zig-Bee.

Functional Configuration of the Embodiment

Described next with reference to FIG. 9 to FIG. 16 is the functional configuration of the embodiment.

Functional Configuration of the Distribution Management System

Figure 9:
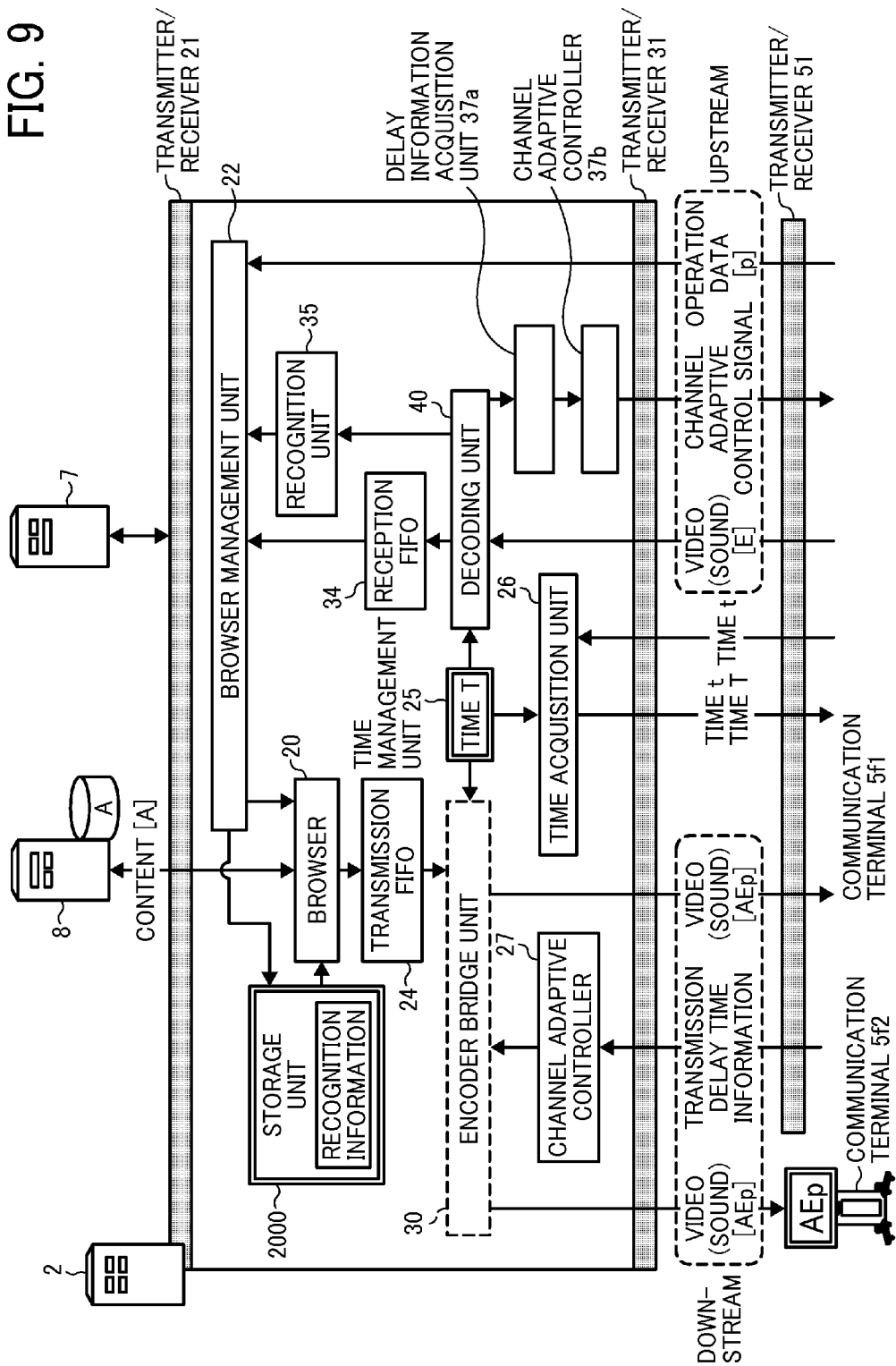
FIG. 9 is a functional block diagram illustrating the main functions of the distribution management system as an embodiment of the present invention.

Described first with reference to FIG. 9 is the functional configuration of the distribution management system 2. FIG. 9 is a functional block diagram illustrating the main functions of the distribution management system. FIG. 9 illustrates a functional configuration when the distribution management system 2 distributes video (sound) data to the communication terminal 5/1, and the distribution management system 2 has the same functional configuration also when the distribution destination is other than the communication terminal 5/1. Although the distribution management system 2 includes a plurality of distribution engine servers, described below is a case when a single distribution engine server is included in order to simplify the description.

As illustrated in FIG. 9, the distribution management system 2 has functional components illustrated in FIG. 9 by the hardware configuration, including a processor such as the CPU 201 or the GPU 215 and the programs illustrated in FIG. 7.

Specifically, the distribution management system 2 includes the browser 20, a transmitter/receiver 21, a browser management unit 22, a transmission first-in first-out (FIFO) buffer 24, a time management unit 25, a time acquisition unit 26, a channel adaptive controller 27, the encoder bridge unit 30, a transmitter/receiver 31, a reception FIFO 34, a recognition unit 35, a delay information acquisition unit 37a, a channel adaptive controller 37b, and the decoding unit 40. The distribution management system 2 further includes a storage unit 2000 constructed by the HDD 204 illustrated in FIG. 7. The storage unit 2000 stores recognition information described below output from the recognition unit 35 and sent through the browser management unit 22. The content data acquired by the browser 20 can be temporarily stored in the storage unit 2000 as a cache.

Among the above functional components, the browser 20 is a browser that operates within the distribution management system 2. The browser 20 is updated corresponding to the enrichment of web content at all times. The browser 20 has, for example, Media Player, Flash Player, JavaScript (registered trademark), CSS, and HTML Renderer. JavaScript includes the standardized product and one unique to the distribution system 1.

Media Player is a browser plug-in for reproducing multimedia files such as video (sound) files within the browser 20. Flash Player is a browser plug-in for reproducing flash content within the browser 20. The unique JavaScript is a JavaScript group that provides the application programming interface (API) of services unique to the distribution system 1. CSS is a technology for efficiently defining the appearance and style of web pages described in HTML. HTML Renderer is an HTML rendering engine.

The transmitter/receiver 21 transmits and receives various kinds of data, various kinds of requests, various kinds of instructions, and the like to and from the terminal management system 7 and the web server 8. For example, the transmitter/receiver 21 acquires web content data from a content site of the web server 8.

The browser management unit 22 manages the browser 20 and the encoder bridge unit 30. For example, the browser management unit 22 instructs the browser 20 to start up and exit and numbers an encoder ID at startup or exit. The encoder ID is identification information the browser management unit 22 numbers in order to manage the process of the encoder bridge unit 30. The browser management unit 22 numbers and manages a browser ID every time the browser 20 is started up. The browser ID is identification information the browser management unit 22 numbers in order to manage the process of the browser 20 to identify the browser 20.

The browser management unit 22 acquires various kinds of operation data from the communication terminal 5 through the transmitter/receiver 31 and outputs them to the browser 20. The operation data is data occurring through operation events (operations through the keyboard 211, the mouse 212, and the like, strokes with the electronic pen P, and the like) on the communication terminal 5. When the communication terminal 5 provides various sensors such as a temperature sensor, a humidity sensor, or an acceleration sensor, the browser management unit 22 acquires sensor information that is an output signal of the sensors from the communication terminal 5 and outputs it to the browser 20. The browser management unit 22 further acquires image (sound) data from the recognition unit 35, outputs it to the browser 20, acquires recognition information described below from the recognition unit 35, and stores it in the storage unit 2000. The browser management unit 22 acquires video (sound) data from the reception FIFO 34 and outputs it to the browser 20.

The transmission FIFO 24 is a buffer that stores the pieces of frame data as pieces of still image (sound) data generated by the browser 20.

The time management unit 25 manages time T unique to the distribution management system 2.

The time acquisition unit 26 performs time adjustment in conjunction with a time controller 56 in the communication terminal 5 described below. Specifically, the time acquisition unit 26 acquires time information (T) indicating time T in the distribution management system 2 from the time management unit 25, receives time information (t) indicating time t in the communication terminal 5 from the time controller 56 described below through the transmitter/receiver 31 and a transmitter/receiver 51, and transmits the time information (t) and the time information (T) to the time controller 56.

The channel adaptive controller 27, which may be referred to as a changing unit, calculates reproduction delay time U based on transmission delay time information (D) and calculates operation conditions such as the frame rate and the data resolution of a converter 10 in the encoder bridge unit 30. This reproduction delay time U is time for delaying reproduction through the buffering of data until being reproduced. In other words, the channel adaptive controller 27 changes the operation of the encoder bridge unit 30 based on the transmission delay time information (D) and the size of the data (e.g., the number of bits or the number of bytes). As described later, the transmission delay time information (D) indicates frequency distribution information based on a plurality of pieces of transmission delay time D1 acquired from a reproduction controller 53 by a delay information acquisition unit 57 of the communication terminal 5. The transmission delay time D1 indicates time from the point when the video (sound) data is transmitted from the distribution management system 2 to the point when it is received by the communication terminal 5.

The encoder bridge unit 30 outputs the pieces of frame data as pieces of still image (sound) data generated by the browser 20 to the converter 10 in the encoder bridge unit 30 described below. In this case, the converter 10 also operates based on the operation conditions calculated by the channel adaptive controller 27. The encoder bridge unit 30 will be described in more detail with reference to FIG. 15 and FIG. 16. FIG. 15 is a detailed diagram of the encoder bridge unit. FIG. 16 is a functional block diagram illustrating the functions of the converter.

As illustrated in FIG. 15, the encoder bridge unit 30 is constructed by a generating/selecting unit 310, a selecting unit 320, and a plurality of converters (10*a*, 10*b*, 10*c*) provided therebetween. Although the three converters are illustrated here, any number of them may be provided.

In the following, any converter is represented as a "converter 10".

The converter 10 converts the data format of the pieces of frame data as pieces of still image (sound) data generated by the browser 20 into a data format of H.264 or the like capable of being distributed to the communication terminal 5 through the communication network 9. For that purpose, as illustrated in FIG. 16, the converter 10 includes a trimming unit 11, a resizing unit 12, a dividing unit 13, and the encoding unit 19. The trimming unit 11, the resizing unit 12, and the dividing unit 13 do not perform any processing on sound data.

The trimming unit 11 performs processing to cut out only part of a still image. The resizing unit 12 changes the reduced scale of a still image. The dividing unit 13 divides a still image as illustrated in FIG. 5.

The encoding unit 19 encodes the pieces of frame data as pieces of still image (sound) data generated by the browser 20, thereby converting them so that video (sound) data can be distributed to the communication terminal 5 through the communication network 9. When the video is not in motion (when there is no inter-frame update (change)), a skip frame (may be sometimes referred to as frame skip) is thereafter inserted until the video moves to save a band.

The generating/selecting unit 310 generates a new converter 10 and selects pieces of frame data as pieces of still image (sound) data to be input to a converter 10 that is already generated. In generating it, the generating/selecting unit 310 generates a converter 10 allowing conversion according to the reproduction capability of video (sound) data in the communication terminal 5. In selecting it, a converter 10 that is already generated is selected. For example, in starting distribution to the communication terminal 5*b* in addition to distribution to the communication terminal 5*a*, the same video (sound) data as video (sound) data being distributed to the communication terminal 5*a* may be distributed to the communication terminal 5*b*. In such a case, furthermore, when the communication terminal 5*b* has the same reproduction capability as the reproduction capability of video (sound) data of the communication terminal 5*a*, the generating/selecting unit 310, without generating a new converter 10*b* for the communication terminal 5*b*, utilizes the converter 10*a* that is already generated for the communication terminal 5*a*.

The selecting unit 320 selects a desired one from the converters 10 that are already generated. The selection by the generating/selecting unit 310 and the selecting unit 320 can perform distribution of various patterns as illustrated in FIG. 6.

The transmitter/receiver 31 transmits and receives various data, requests, and the like to and from the communication terminal 5. This transmitter/receiver 31 transmits various data, requests, and the like to the communication terminal 5 through the communication network 9 from the cloud, thereby allowing the distribution management system 2 to distribute various data, requests, and the like to the communication terminal 5. For example, in the login processing of the communication terminal 5, the transmitter/receiver 31 transmits, to the transmitter/receiver 51 of the communication terminal 5, authentication screen data for prompting a user a login request. The transmitter/receiver 31 also performs data transmission and data reception to and from user applications of the communication terminal 5 and device applications of the communication terminal 5 by a protocol unique to the distribution system 1 through a Hypertext Transfer Protocol over Secure Socket Layer (HTTPS) server. This unique protocol is an HTTPS-based application layer protocol for transmitting and receiving data in real time and without being interrupted between the distribution management system 2 and the communication terminal. The transmitter/receiver 31 also performs transmission response control, real-time data generation, command transmission, reception response control, reception data analysis, and gesture conversion.

Among these, the transmission response control is processing to manage an HTTPS session for downloading requested from the communication terminal 5 in order to transmit data from the distribution management system 2 to the communication terminal 5. The response of the HTTPS session for downloading does not end immediately and holds for a certain period of time (one to a few minutes). The transmitter/receiver 31 dynamically writes data to be sent to the communication terminal 5 in the Body part of the response. In order to eliminate costs for reconnection, another request is allowed to reach from the communication terminal before the previous session ends. By putting the transmitter/receiver 31 on standby until the previous request is completed, overhead can be eliminated even when reconnection is performed.

The real-time data generation is processing to give a unique header to the data of compressed video (and a compressed sound) generated by the encoding unit 19 in FIG. 16 and write it in the Body part of HTTPS.

The command transmission is processing to generate command data to be transmitted to the communication terminal 5 and write it in the Body part of HTTPS directed to the communication terminal 5.

The reception response control is processing to manage an HTTPS session requested from the communication terminal 5 in order for the distribution management system 2 to receive data from the communication terminal 5. The response of this HTTPS session does not end immediately and is held for a certain period of time (one to a few minutes). The communication terminal 5 dynamically writes data to be sent to the transmitter/receiver 31 of the distribution management system 2 in the Body part of the request.

The reception data analysis is processing to analyze the data transmitted from the communication terminal 5 by type and deliver the data to a necessary process.

The gesture conversion is processing to convert a gesture event input to the communication terminal 5f as the electronic blackboard by a user with an electronic pen or in handwriting into data of a format capable of being received by the browser 20.

The reception FIFO 34 is a buffer that stores video (sound) data after being decoded by the decoding unit 40.

The recognition unit 35 performs processing on image (sound) data received from the communication terminal 5. Specifically, for example, the recognition unit 35 recognizes the face, age, sex, and the like of men or animals based on images taken by a camera 62 for signage. For offices, the recognition unit 35 performs name tagging by face recognition and processing of replacing a background image based on images taken by the camera 62. The recognition unit 35 stores recognition information indicating the recognized details in the storage unit 2000. The recognition unit 35 achieves speeding up by performing processing with a recognition expansion board.

The delay information acquisition unit 37a is used for the processing of upstream channel adaptive control correspondingly to a delay information acquisition unit 57 of the communication terminal 5 for use in the processing of downstream channel adaptive control. Specifically, the delay information acquisition unit 37a acquires transmission delay time information (d1) indicating transmission delay time d1 from the decoding unit 40 and holds it for a certain period of time, and when a plurality of pieces of transmission delay time information (d1) are acquired, outputs to the channel adaptive controller 37b transmission delay time information (d) indicating frequency distribution information by a plurality of pieces of transmission delay time d1. The transmission delay time information (d1) indicates time from the point when the video (sound) data is transmitted from the communication terminal 5 to the point when it is received by the distribution management system 2.

The channel adaptive controller 37b is used for the processing of the upstream channel adaptive control correspondingly to the channel adaptive controller 27 for use in the processing of the downstream channel adaptive control. Specifically, the channel adaptive controller 37b calculates the operation conditions of the encoding unit 60 of the communication terminal 5 based on the transmission delay time information (d). The channel adaptive controller 37b transmits a channel adaptive control signal indicating operation conditions such as a frame rate and data resolution to the encoding unit 60 of the communication terminal 5 through the transmitter/receiver 31 and the transmitter/receiver 51.

The decoding unit 40 decodes the video (sound) data transmitted from the communication terminal 5. The decoding unit 40 also outputs the transmission delay time information (d1) indicating transmission delay time d1 to the delay information acquisition unit 37a.

Functional Configuration of Communication Terminal

Figure 10:
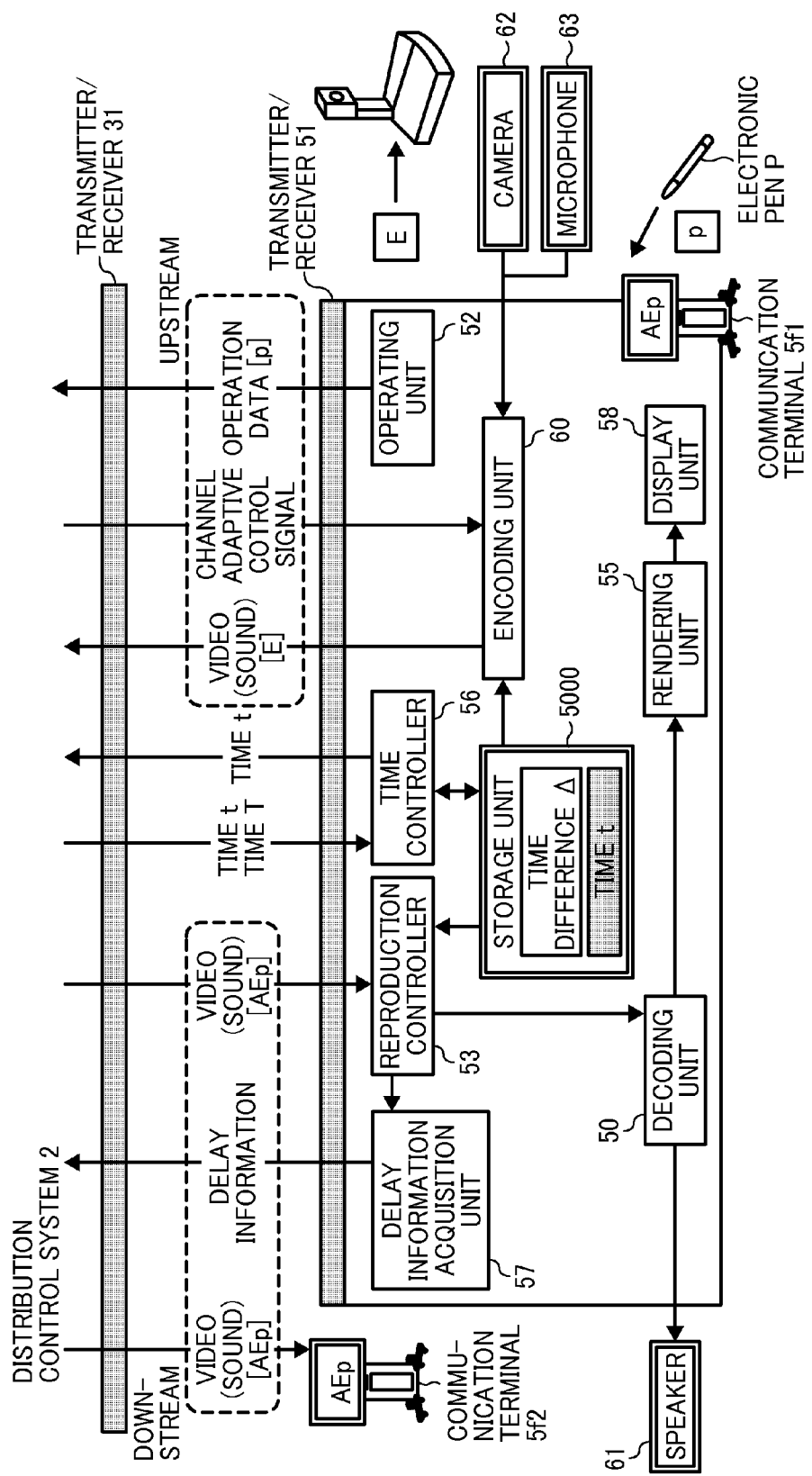
FIG. 10 is a functional block diagram illustrating the main functions of the communication terminal as an embodiment of the present invention.

Described next with reference to FIG. 10 is the functional configuration of the communication terminal 5. FIG. 10 is a functional block diagram illustrating the main functions of the communication terminal. The communication terminal 5 is a terminal serving as an interface for a user to perform a login to the distribution system 1, start and stop the distribution of video (sound) data, and the like.

As illustrated in FIG. 10, the communication terminal 5 has functional components illustrated in FIG. 10 by the hardware configuration including the CPU 201 and the programs illustrated in FIG. 7. When the communication terminal 5 becomes communicable with the other terminals and systems through the communication network 9 by the insertion of the dongle 99 as illustrated in FIG. 2, the communication terminal 5 has the functional components illustrated in FIG. 10 by the hardware configuration and the programs illustrated in FIG. 7 and FIG. 8.

Specifically, the communication terminal 5 includes a decoding unit 50, the transmitter/receiver 51, an operating unit 52, the reproduction controller 53, a rendering unit 55, a time controller 56, the delay information acquisition unit 57, a display unit 58, and the encoding unit 60. The communication terminal 5 further includes a storage unit 5000 constructed by the RAM 203 illustrated in FIG. 7. This storage unit 5000 stores time difference information (Δ) indicating a time difference Δ described below and time information (t) indicating time t in the communication terminal 5.

Among these, the decoding unit 50 decodes video (sound) data distributed from the distribution management system 2 and output from the reproduction controller 53.

The transmitter/receiver 51 transmits and receives various data, requests, and the like to and from the transmitter/receiver 31 of the distribution management system 2 and a transmitter/receiver 71a of the terminal management system 7. For example, in the login processing of the communication terminal 5, the transmitter/receiver 51 performs a login request to the transmitter/receiver 71a of the terminal management system 7 based on the startup of the communication terminal 5 by the operating unit 52.

The operating unit 52 performs processing to receive operation input by a user, for example, receives input, selection, or the like with a power switch, a keyboard, a mouse, the electronic pen P, or the like, and transmits it as operation data to the browser management unit 22 of the distribution management system 2.

The reproduction controller 53 buffers the video (sound) data (a packet of real-time data) received from the transmitter/receiver 51 and outputs it to the decoding unit 50 considering reproduction delay time U.

The rendering unit 55 renders the data decoded by the decoding unit 50.

The time controller 56 performs time adjustment in conjunction with the time acquisition unit 26 of the distribution management system 2. Specifically, the time controller 56 acquires time information (t) indicating time t in the communication terminal 5 from the storage unit 5000. The time controller 56 issues a request for time information (T) indicating time T in the distribution management system 2 to the time acquisition unit 26 of the distribution management system 2 through the transmitter/receiver 51 and the transmitter/receiver 31.

In this case, the time information (t) is transmitted concurrently with the request for the time information (T).

The delay information acquisition unit 57 acquires from the reproduction controller 53 transmission delay time information (D1) indicating transmission delay time D1 and holds it for a certain period of time, and when a plurality of pieces of transmission delay time information (D1) are acquired, outputs transmission delay time information (D) indicating frequency distribution information by a plurality of pieces of transmission delay time D1 to the channel adaptive controller 27 through the transmitter/receiver 51 and the transmitter/receiver 31. The transmission delay time information (D) is transmitted, for example, once in a hundred frames.

The display unit 58 reproduces the data rendered by the rendering unit 55.

The encoding unit 60 transmits video (sound) data [E] that is acquired from a built-in microphone 213 or the camera 62 and a microphone 63, which are externally attached, and is encoded, time information ($t_0$) indicating the current time to in the communication terminal 5 acquired from the storage unit 5000, and the time difference information ($\Delta$) indicating the time difference $\Delta$ acquired from the storage unit 5000 to the decoding unit 40 of the distribution management system 2 through the transmitter/receiver 51 and the transmitter/receiver 31.

The encoding unit 60 changes the operation conditions of the encoding unit 60 based on the operation conditions indicated by the channel adaptive control signal received from the channel adaptive controller 37b. The encoding unit 60, in accordance with the new operation conditions, transmits the video (sound) data [E] that is acquired from the camera 62 and the microphone 63 and is encoded, the time information ($t_0$) indicating the current time $t_0$ in the communication terminal 5 acquired from the storage unit 5000, and the time difference information ( ) indicating the time difference acquired from the storage unit 5000 to the decoding unit 40 of the distribution management system 2 through the transmitter/receiver 51 and the transmitter/receiver 31.

The built-in microphone 213, the externally attached camera 62 and the microphone 63, and the like are examples of an inputting unit and are devices that need encoding and decoding. The inputting unit may output touch data and smell data in addition to video (sound) data.

The inputting unit includes various sensors such as a temperature sensor, a direction sensor, an acceleration sensor, and the like.

Functional Configuration of the Terminal Management System

Figure 11:
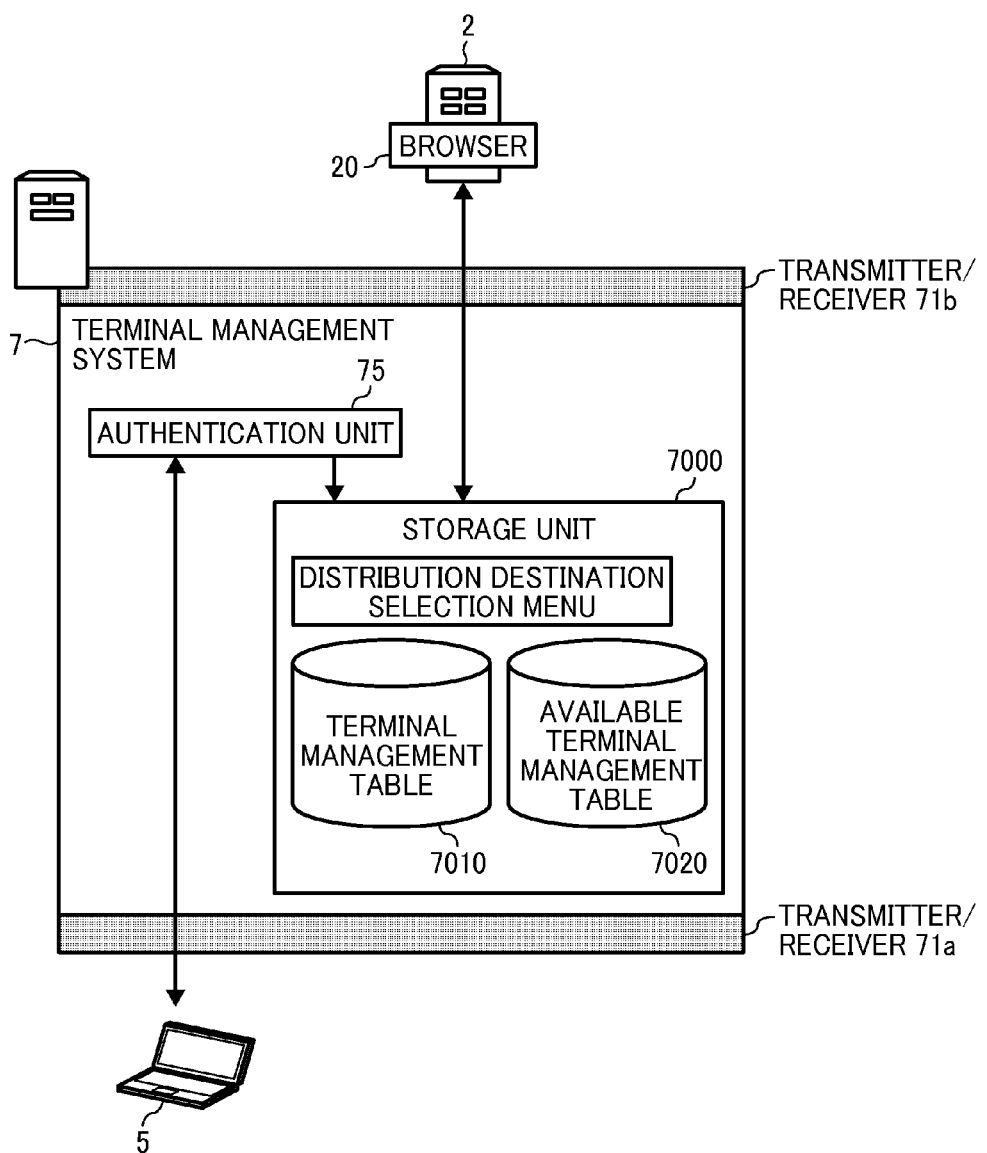
FIG. 11 is a functional block diagram illustrating the functions of the terminal management system as an embodiment of the present invention.

Described next with reference to FIG. 11 is the functional configuration of the terminal management system 7. FIG. 11 is a functional block diagram illustrating the functions of the terminal management system.

As illustrated in FIG. 11, the terminal management system 7 has functional components illustrated in FIG. 11 by the hardware configuration including the CPU 201 and the programs illustrated in FIG. 7.

Specifically, the terminal management system 7 includes the transmitter/receiver 71a, a transmitter/receiver 71b, and an authentication unit 75.

The terminal management system 7 further includes a storage unit 7000 constructed by the HDD 204 illustrated in FIG. 7. The storage unit 7000 stores distribution destination selection menu data, a terminal management table 7010, and an available terminal management table 7020.

Among these, the distribution destination selection menu is data indicating such a destination selection menu screen as illustrated in FIG. 12.

As illustrated in FIGS. 13A and 13B, the terminal management table 7010 manages the terminal ID of the communication terminal 5, a user certificate, contract information when a user uses the services of the distribution system 1, the terminal type of the communication terminal 5, setting information indicating the home uniform resource locators (URLs) of the respective communication terminals 5, the execution environment information of the respective communication terminals 5, a shared ID, installation position information, and display name information in association with each other. Among these, the execution environment information includes "favorites", "previous Cookie information", and "cache file" of the respective communication terminals 5, which are sent to the distribution management system 2 together with the setting information after the login of each communication terminal 5 and are used for performing an individual service on each communication terminal 5.

The shared ID is an ID that is used when each user distributes the same video {sound} data as video (sound) data being distributed to his/her own communication terminal 5 to the other communication terminals 5, thereby performing remote sharing processing and is identification information that identifies the other communication terminals and the other communication terminal group. For example, the shared ID of the terminal ID "t006" is "v006", the shared ID of the terminal ID "t007" is "v006", and the shared ID of the terminal ID "t008" is "v006". When a request for remote sharing processing with the communication terminals (5f1, 5f2, and 5f3) with the terminal ID "v006" is issued from the communication terminal 5a with the terminal ID "t001", the distribution management system 2 distributes the same video (sound) data as video (sound) data being distributed to the communication terminals 5a to the communication terminals (5f1, 5f2, and 5f3). However, when the communication terminals 5a and the communication terminals (5f1, 5f2, and 5f3) are different in the resolution of the display unit 58, the distribution management system 2 distributes the video (sound) data accordingly.

As illustrated in FIG. 5, for example, the installation position information indicates an installation position when the communication terminals (5f1, 5f2, and 5f3) are arranged side by side. The display name information is information indicating the details of the display name in the distribution destination selection menu illustrated in FIG. 12.

The available terminal management table 7020 manages, in association with each terminal ID, a shared ID indicating a communication terminal or a communication terminal group with which the communication terminal 5 indicated by the terminal ID can perform remote sharing processing.

Described next returning to FIG. 11 is the functional components.

The transmitter/receiver 71a transmits and receives various data, requests, and the like to and from the communication terminal 5. For example, the transmitter/receiver 71a receives a login request from the transmitter/receiver 51 of the communication terminal 5 and transmits an authentication result of the login request to the transmitter/receiver 51.

The transmitter/receiver 71b transmits and receives various data, requests, and the like to and from the distribution management system 2. For example, the transmitter/receiver 71b receives a request for the data of the distribution destination selection menu from the transmitter/receiver 21 of the distribution management system 2 and transmits the data of the distribution destination selection menu to the transmitter/receiver 21.

The authentication unit 75 searches the terminal management table 7010 based on the terminal ID and the user certificate received from the communication terminal 5, thereby determining whether there are any terminal ID and user certificate of the same combination, thereby authenticating the communication terminal 5.

Operations or Processing of the Embodiment

Described next with reference to FIG. 17 to FIG. 24 are operations or pieces of processing of the present embodiment. These pieces of processing are performed by the respective CPUs of the distribution management system 2, the communication terminal 5, the terminal management system 7, and the web server 8 in accordance with the respective programs stored therein.

Basic Distribution Processing

Figure 17:
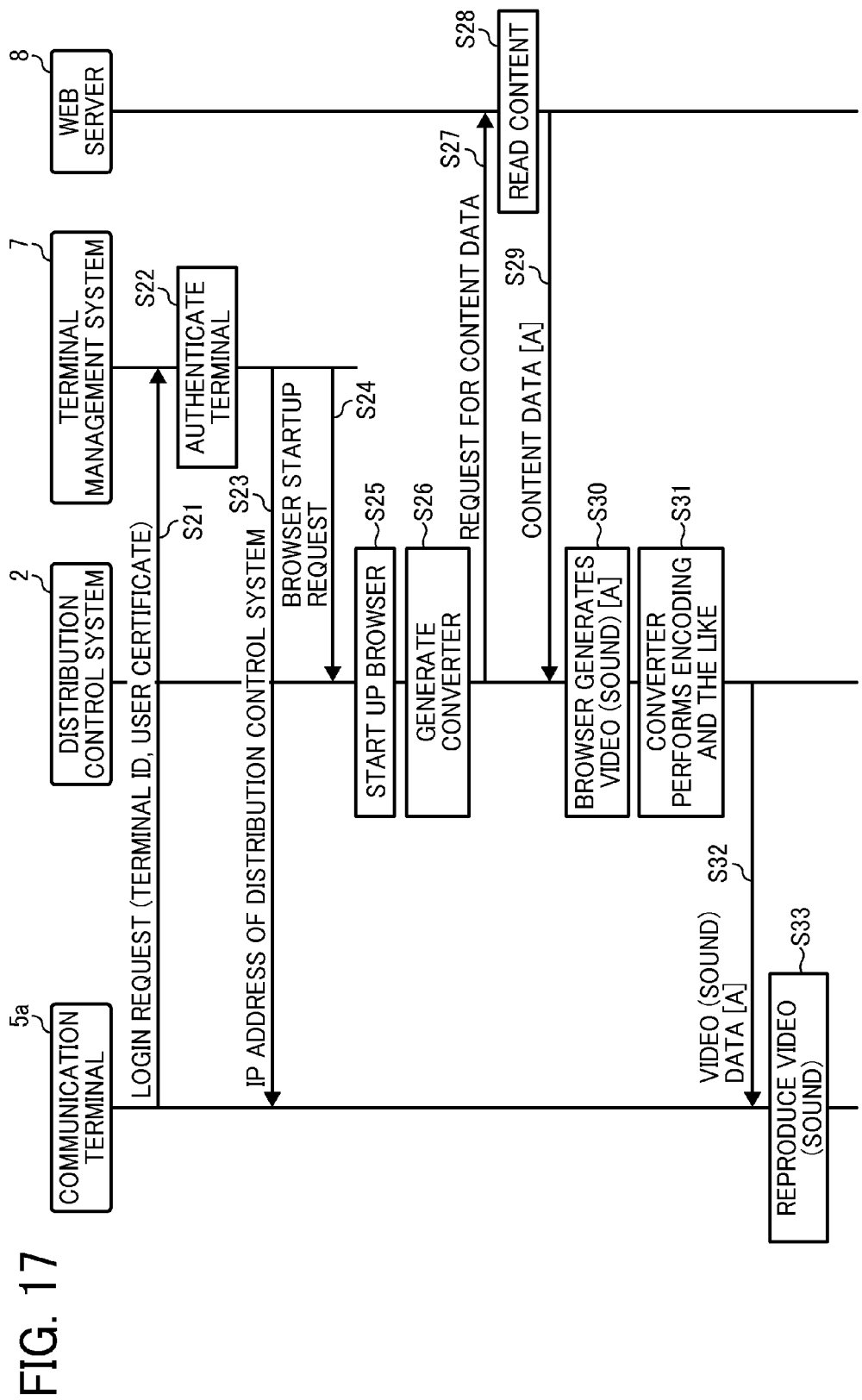
FIG. 17 is a sequence diagram illustrating the basic distribution processing of the distribution management system as an embodiment of the present invention.

Described first with reference to FIG. 17 is specific distribution processing in the basic distribution method illustrated in FIG. 3. FIG. 17 is a sequence diagram illustrating the basic distribution processing of the distribution management system. Although described here is a case of issuing a login request using the communication terminal 5a, a login may be performed using the communication terminal 5 other than the communication terminal 5a.

As illustrated in FIG. 17, when a user turns on the communication terminal 5a, the transmitter/receiver 51 of the communication terminal 5a issues a login request to the transmitter/receiver 71a of the terminal management system 7 (S21). This causes the transmitter/receiver 71a to receive the login request. This login request includes the terminal ID and the user certificate of the communication terminal 5a. The authentication unit 75 then acquires the terminal ID and the user certificate of the communication terminal 5a.

The authentication unit 75 searches the terminal management table 7010 based on the terminal ID and the user certificate, thereby determining whether there are any terminal ID and user certificate of the same combination, thereby authenticating the communication terminal 5a (S22). Described below continuously is a case when the terminal ID and the user certificate of the same combination are present in the terminal management table 7010, that is, when the communication terminal 5a is determined as a proper terminal in the distribution system 1.

The authentication unit 75 of the terminal management system 7 transmits the IP address of the distribution management system 2 to the transmitter/receiver 51 of the communication terminal 5a via the transmitter/receiver 71a (S23). The IP address of the distribution management system 2 is acquired from the distribution management system 2 by the terminal management system 7 and is stored in the storage unit 7000 in advance.

The transmitter/receiver 71b of the terminal management system 7 issues a browser 20 startup request to the browser management unit 22 via the transmitter/receiver 21 of the distribution management system 2 (S24). Accordingly, the browser management unit 22 starts up the browser 20 (S25).

The generating/selecting unit 310 of the encoder bridge unit 30 generates the converter 10 in accordance with the reproduction capability of the communication terminal 5a {the resolution of the display and the like) and the type of content (S26). Next, the browser 20 issues a request for content data [A] to the web server 8 (S27). In response thereto, the web server 8 reads the requested content data [A] from its own storage unit (not illustrated) (S28).

The web server 8 then transmits the content data [A] to the transmitter/receiver 21 of the distribution management system 2 (S29).

The browser 20 renders the content data [A], thereby generating pieces of image (sound) data and outputs them to the transmission FIFO 24 (S30). The converter 10 encodes the pieces of image (sound) data stored in the transmission FIFO 24, thereby converting them into video (sound) data [A] to be output to the communication terminal 5a (S31).

The encoder bridge unit 30 transmits the video (sound) data [A] to the reproduction controller 53 via the transmitter/receiver 31 and the transmitter/receiver 51 (S32). As a result, in the communication terminal 5a, the reproduction controller 53 outputs the video (sound) data [A] to the decoding unit 51.

In the communication terminal 5a, a speaker 61 reproduces a sound based on decoded sound data [A], and the display unit 58 reproduces video based on video data [A] acquired from the decoding unit 50 and rendered by the rendering unit 55 (S33).

Figure 18:
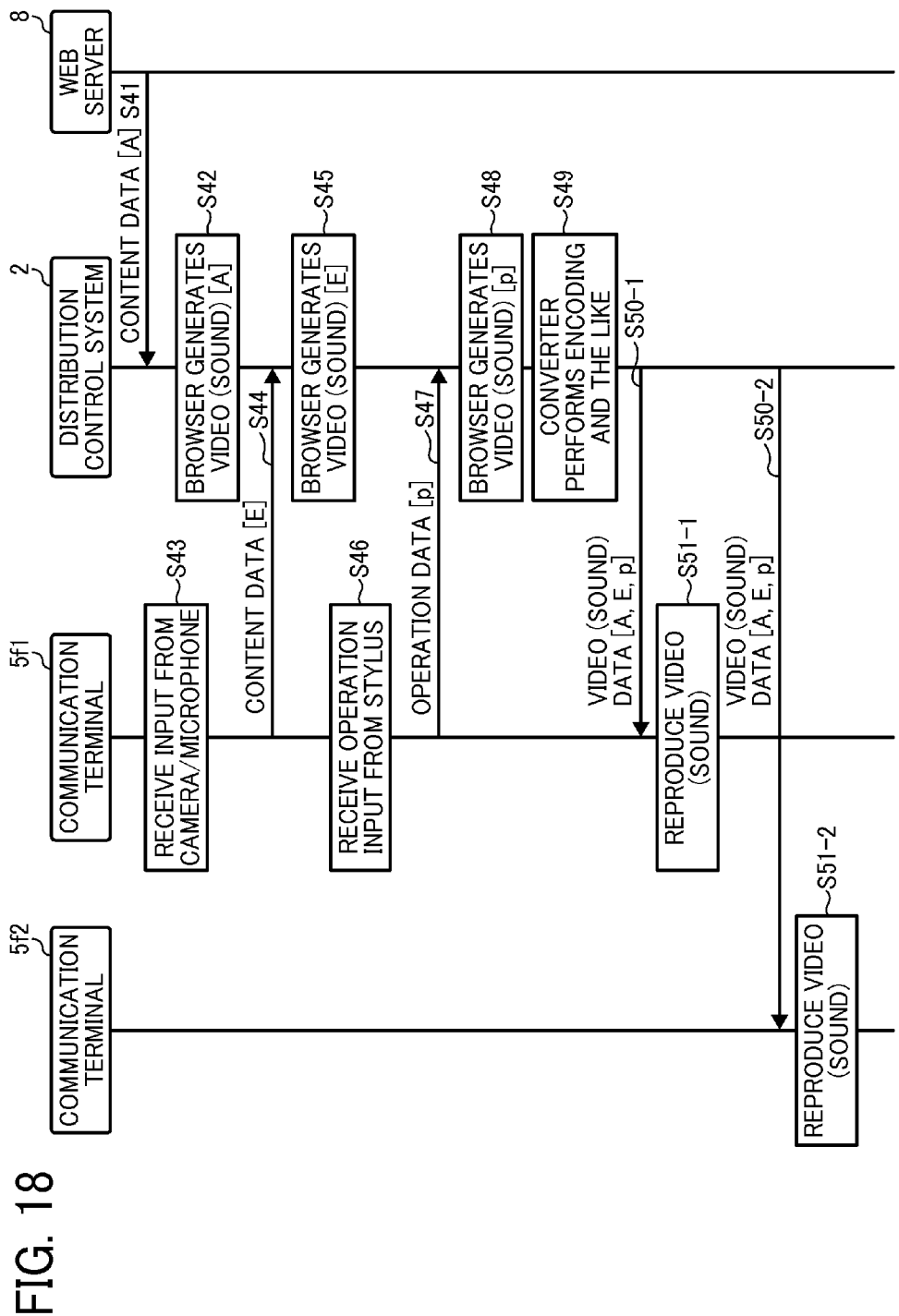
FIG. 18 is a sequence diagram illustrating communication processing using a plurality of communication terminals through the distribution management system as an embodiment of the present invention.

Processing of Composite Distribution Using a Plurality of Communication Terminals Described next with reference to FIG. 18 is communication processing using a plurality of communication terminals through the distribution management system. FIG. 18 is a sequence diagram illustrating distribution processing using a plurality of communication terminals through the distribution management system. Described here is specific processing for the pattern illustrated in FIG. 6 as the communication terminals 5. Because login processing, browser startup, and the like similar to steps from S21 to S29 are performed also here, described first is processing corresponding to S29.

As illustrated in FIG. 18, the browser 20 of the distribution management system 2 receives content data [A] from the web server 8 via the transmitter/receiver 21 (S41). The browser 20 renders the content data [A], thereby generating video (sound) data and outputs them to the transmission FIFO 24 (S42).

When the encoding unit 60 of the communication terminal 5/1 receives the input of content data [E] from the camera 62 and the microphone 63 (S43), the encoding unit 60 encodes the content data [E] and transfers the content data [E] to the decoding unit in the distribution management system 2 via the transmitter/receiver 51 and the transmitter/receiver 31 (S44). The decoding unit 40 of the distribution management system 2 decodes the content data [E] and outputs it to the browser 20 via the reception FIFO 34. The browser 20 renders the content data [E], thereby generating image (sound) data [E] and outputs it to the transmission FIFO 24 (S45). In this case, the browser 20 outputs with a layout in which the content data [E] is combined with the content data [A] that is already acquired.

In addition, when the operating unit 52 of the communication terminal 5/1 receives the input of a stroke operation with the electronic pen P1 (S46), the operating unit 52 transfers operation data [p] to the browser management unit 22 in the distribution management system 2 via the transmitter/receiver 51 and the transmitter/receiver 31 (S47). Consequently, the operation data [p] is input to the browser from the browser management unit 22. The browser 20 renders the operation data [p], thereby generating image data [p] and outputs it to the transmission FIFO 24 (S48). In this case, browser 20 outputs with a layout in which the operation data [p] is combined with the content data ([A], [E]) that is already acquired.

The converter 10 encodes image (sound) data ([A], [E], [p]) stored in the transmission FIFO 24, thereby converting it into video (sound) data ([A], [E], [p]) to be distributed to the communication terminal 5a (S49). The encoder bridge unit 30 transfers the video (sound) data ([A], [E], [p]) to the reproduction controller 53 via the transmitter/receiver 31 and the transmitter/receiver 51 (S50-1). The decoding unit 50 decodes the video (sound) data ([A], [E], [p]). After that, the speaker 61 reproduces a sound based on the video (sound) data ([A], [E], [p]) decoded by the decoding unit 50, and the display unit 58 reproduces video based on the video (sound) data ([A], [E], [p]) decoded by the decoding unit 50 and rendered by the rendering unit 55 (S51-1).

For also the communication terminal 5/2, as is the case with S50-1, the encoder bridge unit 30 transfers the video (sound) data ([A], [E], [p]) to the reproduction controller 53 via the transmitter/receiver 31 and the transmitter/receiver 51 (S50-2). Subsequently, the speaker 61 reproduces a sound based on the video (sound) data ([A], [E], [p]) decoded by the decoding unit 50, and the display unit 58 reproduces video based on the video (sound) data ([A], [E], [p]) decoded by the decoding unit 50 and rendered by the rendering unit 55 (S51-2). Thus, the same video (sound) as the video (sound) output to the communication terminal 5/1 is output also to the communication terminal 5/2.

Processing of Time Adjustment

Figure 19:
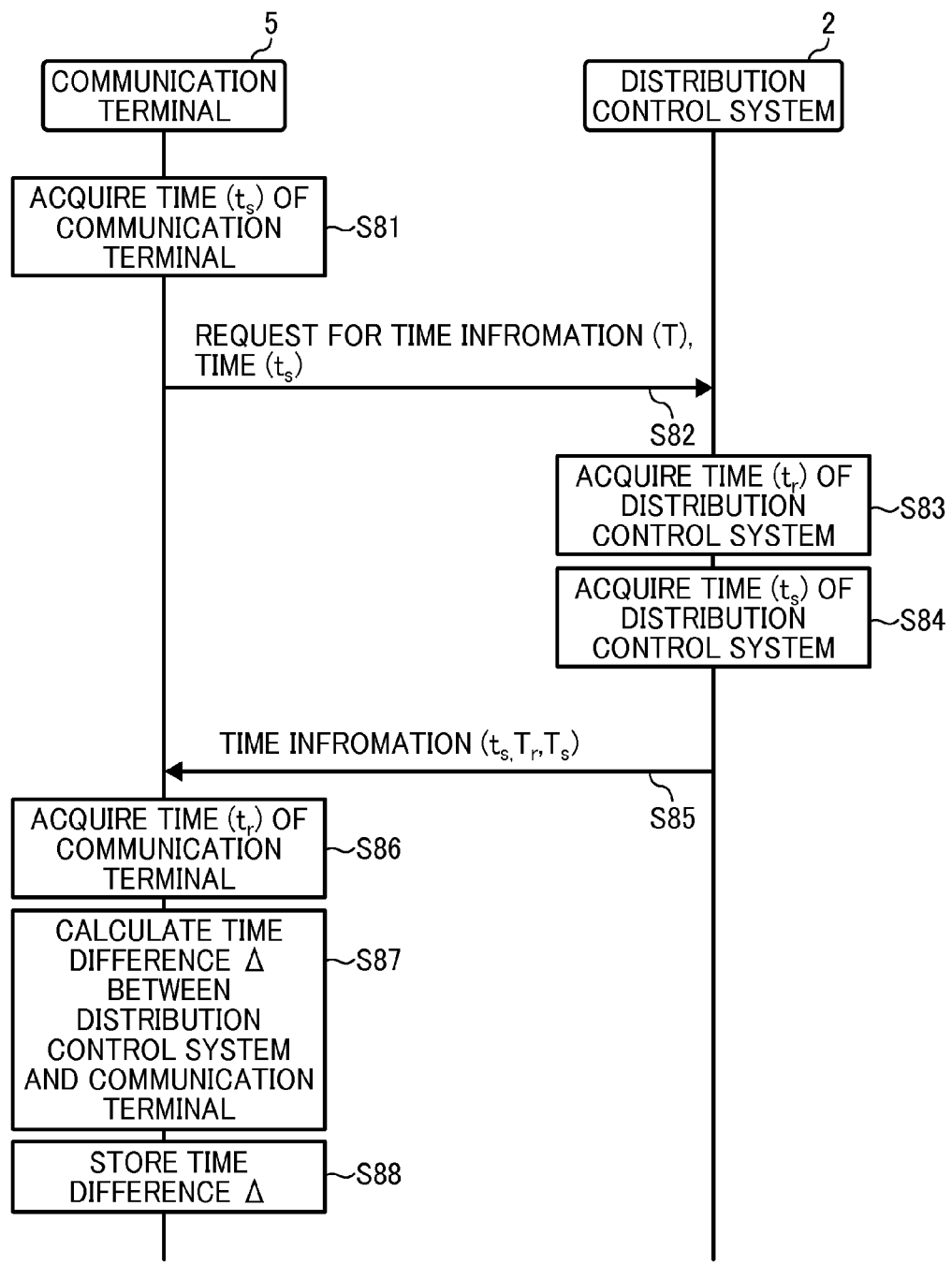
FIG. 19 is a sequence diagram illustrating the processing of time adjustment as an embodiment of the present invention.

Described next with reference to FIG. 19 is the processing of time adjustment. FIG. 19 is a sequence diagram illustrating the processing of time adjustment.

In order to acquire time indicating a point in time when the transmitter/receiver 51 issues a request for the time information (T) to the distribution management system 2, the time controller 56 of the communication terminal 5 acquires time information ($t_s$) in the communication terminal 5 from the storage unit 5000 (S81). The transmitter/receiver 51 issues a request for the time information (T) to the transmitter/receiver 31 (S82). In this case, the time information ($t_s$) is transmitted concurrently with the request for the time information (T).

In order to acquire time indicating a point in time when the transmitter/receiver 31 received the request in S82, the time acquisition unit 26 of the distribution management system 2 acquires time information ($T_r$) in the distribution management system 2 from the time management unit 25 (S83). In order to acquire time indicating a point in time when the transmitter/receiver 31 responds to the request in S82, the time acquisition unit 26 further acquires time information ($T_s$) in the distribution management system 2 from the time management unit 25 (S84). The transmitter/receiver 31 then transmits the time information ($t_s$, $T_r$, $T_s$) to the transmitter/receiver 51 (S85).

In order to acquire time indicating a point in time when the transmitter/receiver 51 received the response in S85, the time controller 56 of the communication terminal 5 acquires time information ($t_r$) in the communication terminal 5 from the storage unit 5000 (S86). The time controller 56 of the communication terminal 5 calculates the time difference Δ between the distribution management system 2 and the communication terminal 5 (S87). This time difference Δ is represented by Equation (1) below.

$$\Delta = ((T_r + T_s)/2) - ((t_r + t_s)/2) \quad (1)$$

The time controller 56 stores the time difference information (Δ) indicating the time difference Δ in the storage unit 5000 (S88). The series of processing of time adjustment is performed, for example, regularly every minute.

Processing of Downstream Channel Adaptive Control

Figure 20:
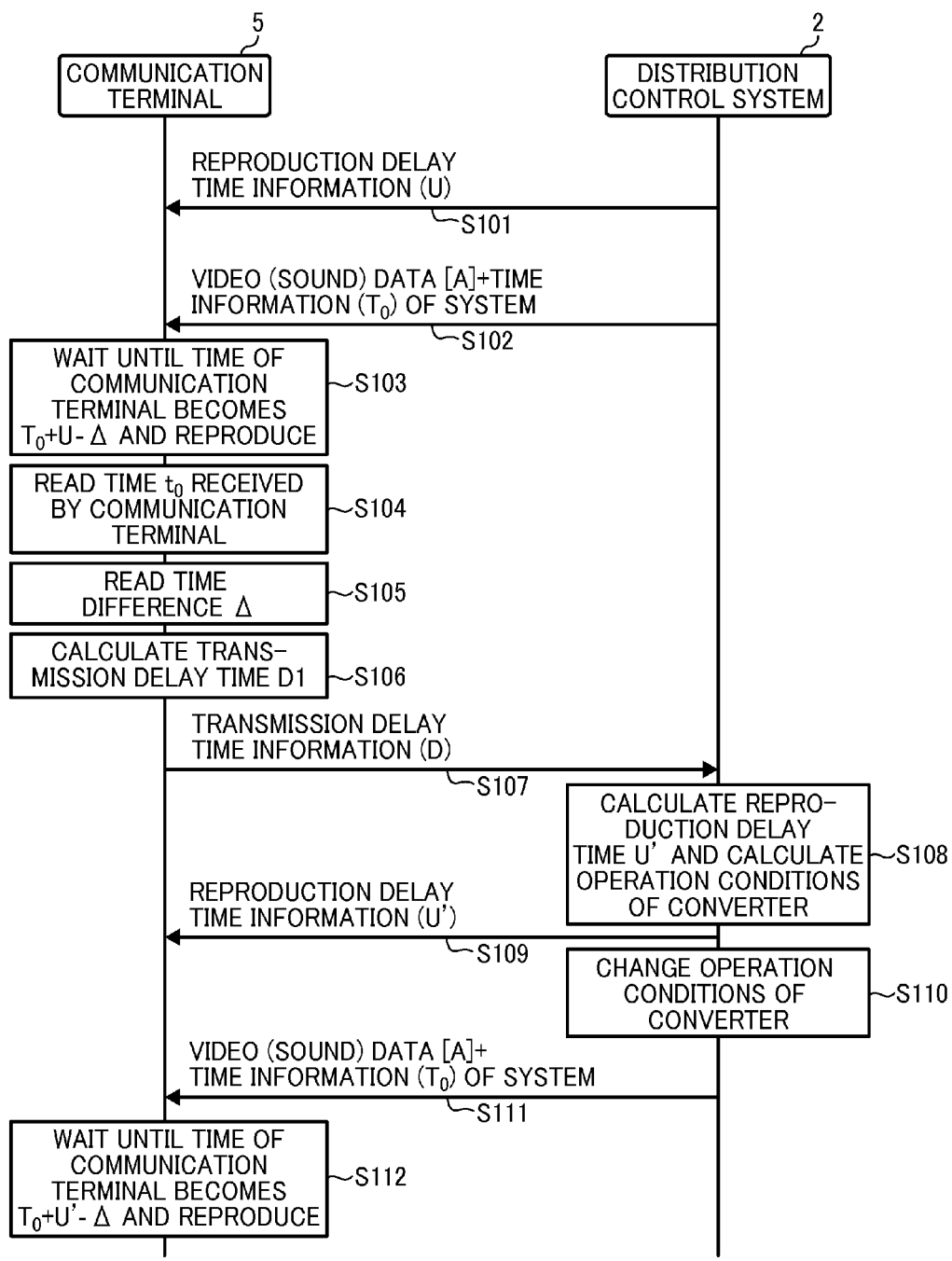
FIG. 20 is a sequence diagram illustrating the processing of channel adaptive control on data transmitted from the distribution management system to the communication terminal as an embodiment of the present invention.

Described next with reference to FIG. 20 is the processing of channel adaptive control on data transmitted from the distribution management system 2 to the communication terminal 5 (downstream). FIG. 20 is a sequence diagram illustrating the processing of channel adaptive control on data transmitted from the distribution management system to the communication terminal.

First, The encoder bridge unit 30 adds time information ($T_0$) indicating time $T_0$ indicating a point in time acquired from the time management unit 25 as a time stamp to the video (sound) data [A] acquired from the transmission FIFO 24 and encoded etc. and transfers it to the reproduction controller 53 via the transmitter/receiver 31 and the transmitter/receiver 51 (S101).

In the communication terminal 5, the reproduction controller 53 waits until the time ($T_0 + U - \Delta$) in the communication terminal 5 and then outputs the video (sound) data to the decoding unit 50, thereby causing the speaker 61 to output a sound and the display unit 58 to reproduce video through the rendering unit 55 (S103). This causes only video (sound) data the communication terminal 5 received within the range of the reproduction delay time U represented by Equation (2) below to be reproduced, while video (sound) data out of the range is deleted without being reproduced.

$$U \geq (t_0 + \Delta) - T_0 \quad (2)$$

The reproduction controller 53 reads the current time to in the communication terminal 5 from the storage unit 5000 (S104). This time to indicates time in the communication terminal 5 at a point in time when the communication terminal 5 received video (sound) data from the distribution management system 2. The reproduction controller 53 further reads the time difference information (Δ) indicating the time difference Δ stored in S86 from the storage unit 5000 (S105). The reproduction controller 53 then calculates transmission delay time D1 indicating time from when the video (sound) data is transmitted from the distribution management system 2 to when it is received by the communication terminal 5 (S106). This calculation is performed by Equation (3) below, when the communication network 9 becomes congested, the transmission delay time D1 becomes longer.

$$D1 = (t_0 + \Delta) - T_0 \quad (3)$$

The delay information acquisition unit 57 acquires transmission delay time information (D1) indicating the transmission delay time D1 from the reproduction controller 53 and holds it for a certain period of time, and when a plurality of pieces of transmission delay time information (D1) are acquired, the delay information acquisition unit 57 outputs to the transmitter/receiver 51 transmission delay time information (D) indicating frequency distribution information by a plurality of pieces of transmission delay time D1 (S107).

Next, the channel adaptive controller 27 of the distribution management system 2 newly calculates reproduction delay information U' based on the transmission delay time information (D) and calculates the operation conditions such as the frame rate and the data resolution of the converter 10 (S108).

Next, the encoder bridge unit 30 of the distribution management system 2 transfers reproduction delay time information (U') indicating the reproduction delay time for delaying reproduction newly calculated in S108 described above to the reproduction controller 53 via the transmitter/receiver 31 and the transmitter/receiver 51 (S109).

The converter 10 further changes the operation conditions of the converter 10 based on the channel adaptive control signal indicating the operation conditions (S110). For example, if the transmission delay time D1 is too long, in case the reproduction delay time U is made longer in accordance with the transmission delay time D1, reproduction time at the speaker 61 and the display unit 58 becomes too delayed. As a result, there is a limit to making the reproduction delay time U longer. In view of this, the channel adaptive controller 27 not only instructs the encoder bridge unit 30 to change the reproduction delay time U to be the reproduction delay time U' but also instructs the converter 10 to decrease the frame rate of video (sound) data and to decrease the resolution of video (sound) data, thereby addressing the congestion of the communication network 9. This causes the encoder bridge unit 30, as with S102 described above, to add the current time $T_0$ to the video (sound) data as a time stamp in accordance with the operation conditions after being changed and to transfer it to the reproduction controller 53 in the communication terminal 5 (S111).

In the communication terminal 5, the reproduction controller 53 waits until the time (To+U'−Δ) in the communication terminal 5 and then outputs the video (sound) data to the decoding unit 50, thereby, as with S103 described above, causing the speaker 61 to output a sound and the display unit 58 to reproduce video through the rendering unit 55 (S112). After that, the processing in and after S104 is performed continuously. Thus, the processing of the downstream channel adaptive control is performed continuously.

Processing of Upstream Channel Adaptive Control

Figure 21:
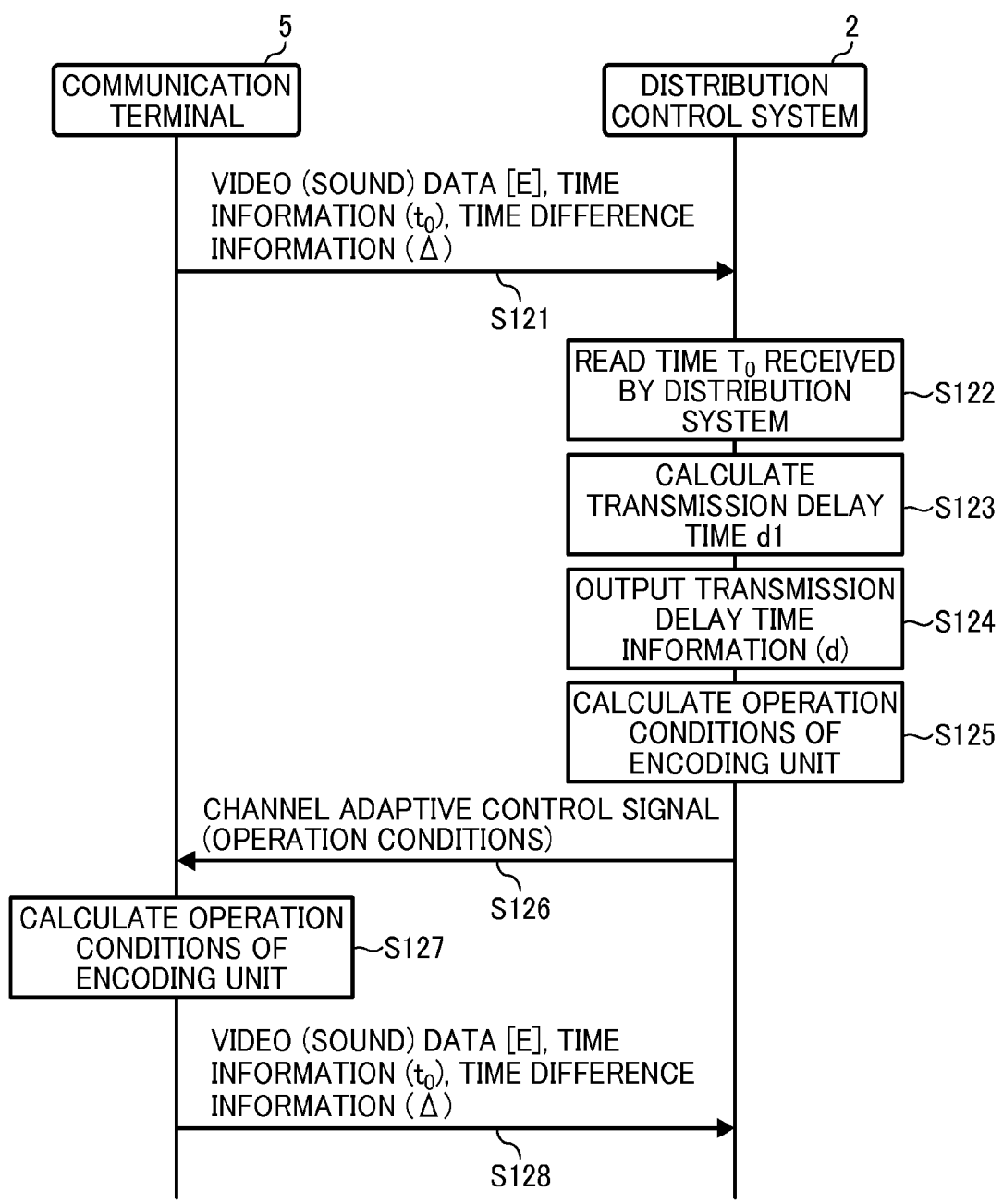
FIG. 21 is a sequence diagram illustrating the processing of channel adaptive control on data transmitted from the communication terminal to the distribution management system as an embodiment of the present invention.

Described next with reference to FIG. 21 is the processing of channel adaptive control on data transmitted from the communication terminal 5 to the distribution management system 2 (upstream). FIG. 20 is a sequence diagram illustrating the processing of channel adaptive control on data transmitted from the communication terminal to the distribution management system.

First, the encoding unit 60 of the communication terminal 5 transfers video (sound) data [E] input from the camera 62 and the microphone 63 and encoded, the time information ($t_0$) indicating the current time to in the communication terminal 5 acquired from the storage unit 5000, and the time difference information (Δ) indicating the time difference Δ acquired from the storage unit 5000 to the decoding unit 40 of the distribution management system 2 through the transmitter/receiver 51 and the transmitter/receiver 31 (S121).

In the distribution management system 2, the decoding unit 40 reads time $T_0$ indicating a point in time when the video (sound) data [E] and the like were received in S121 described above from the time management unit 25 (S122). The decoding unit 40 then calculates transmission delay time d1 indicating time from when the video (sound) data is transmitted from the communication terminal 5 to when it is received by the distribution management system 2 (S123). This calculation is performed by Equation (4) below, and if the communication network 9 becomes congested, the transmission delay time d1 becomes longer.

$$d1 = T_0 - (t_0 + \Delta) \quad (4)$$

As is the case with the delay information acquisition unit 57, the delay information acquisition unit 37a of the distribution management system 2 acquires transmission delay time information (d1) indicating transmission delay time d1 from the decoding unit 40 and holds it for a certain period of time, and when a plurality of pieces of transmission delay time information (d1) are acquired, outputs transmission delay time information (d) indicating frequency distribution information by a plurality of pieces of transmission delay time d1 to the channel adaptive controller 37b (S124).

Based on the transmission delay time information (d), the channel adaptive controller 37b calculates the operation conditions of the encoding unit 60 (S125). The channel adaptive controller 37b transmits a channel adaptive control signal indicating operation conditions such as a frame rate and data resolution to the encoding unit 60 of the communication terminal 5 through the transmitter/receiver 31 and the transmitter/receiver 51 (S126). In other words, in the case of the channel adaptive control illustrated in FIG. 20 (downstream), the channel adaptive control signal is output to the encoder bridge unit 30 within the same distribution management system 2, and in contrast, in the case of the channel adaptive control illustrated in FIG. 21 (upstream), the channel adaptive control signal is transmitted to the communication terminal 5 from the distribution management system 2 through the communication network 9.

Based on the operation condition indicated by the received channel adaptive control signal, the encoding unit 60 modifies the operation conditions of the encoding unit 60 (S127). Based on the modified operation condition, just like the case in S121, the encoding unit 60 of the communication terminal 5 transfers video (sound) data [E] input from the camera 62 and the microphone 63 and encoded, the time information ($t_0$) indicating the current time $t_0$ in the communication terminal 5 acquired from the storage unit 5000, and the time difference information (Δ) indicating the time difference Δ acquired from the storage unit 5000 to the decoding unit 40 of the distribution management system 2 through the transmitter/receiver 51 and the transmitter/receiver 31 (S128). After that, the processing in and after S122 is performed continuously. Thus, the processing of the upstream channel adaptive control is performed continuously.

Processing of Multi-Display

Figure 22:
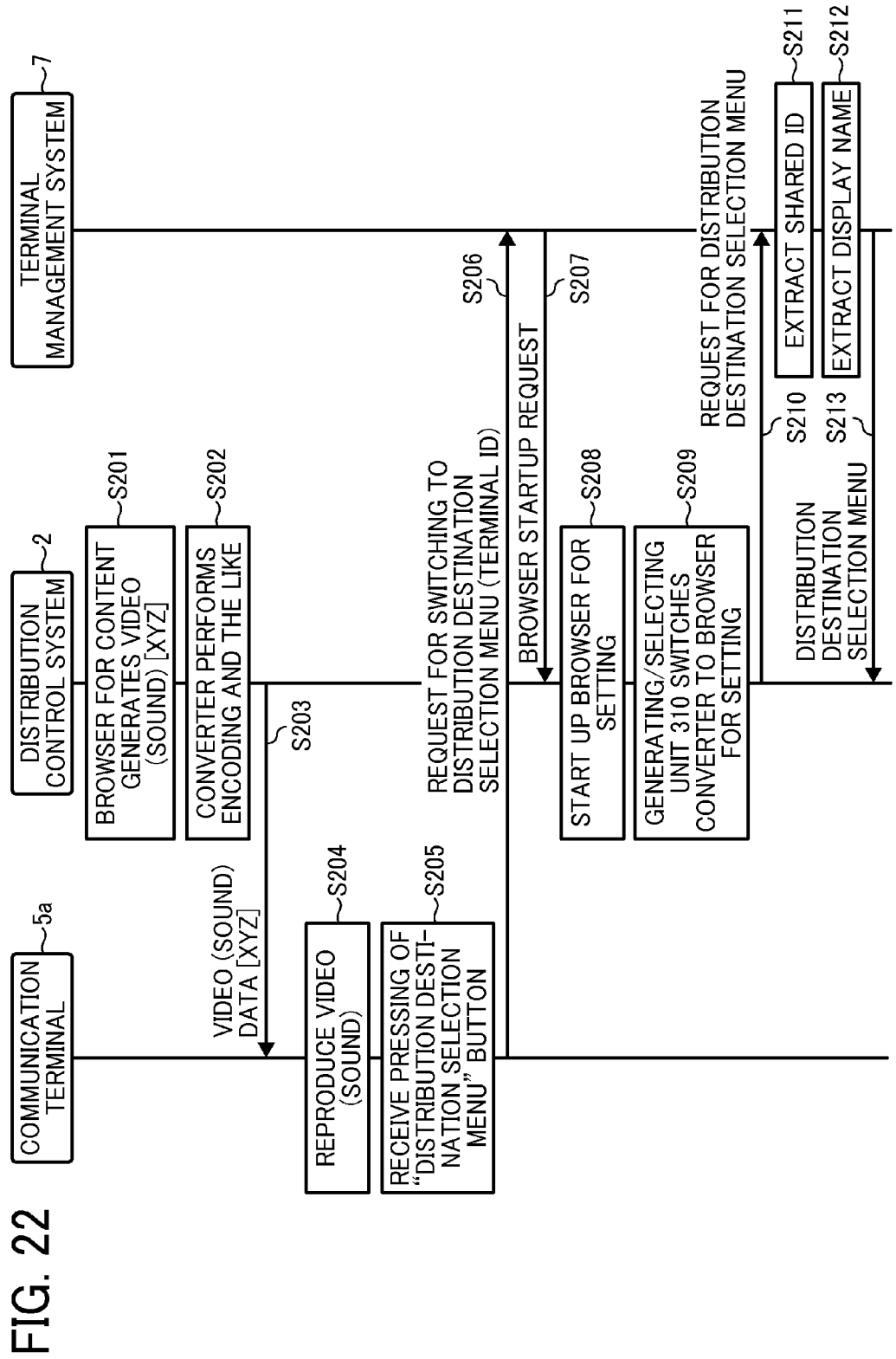
FIG. 22 is a sequence diagram illustrating the processing of multi-display as an embodiment of the present invention.
Figure 23:
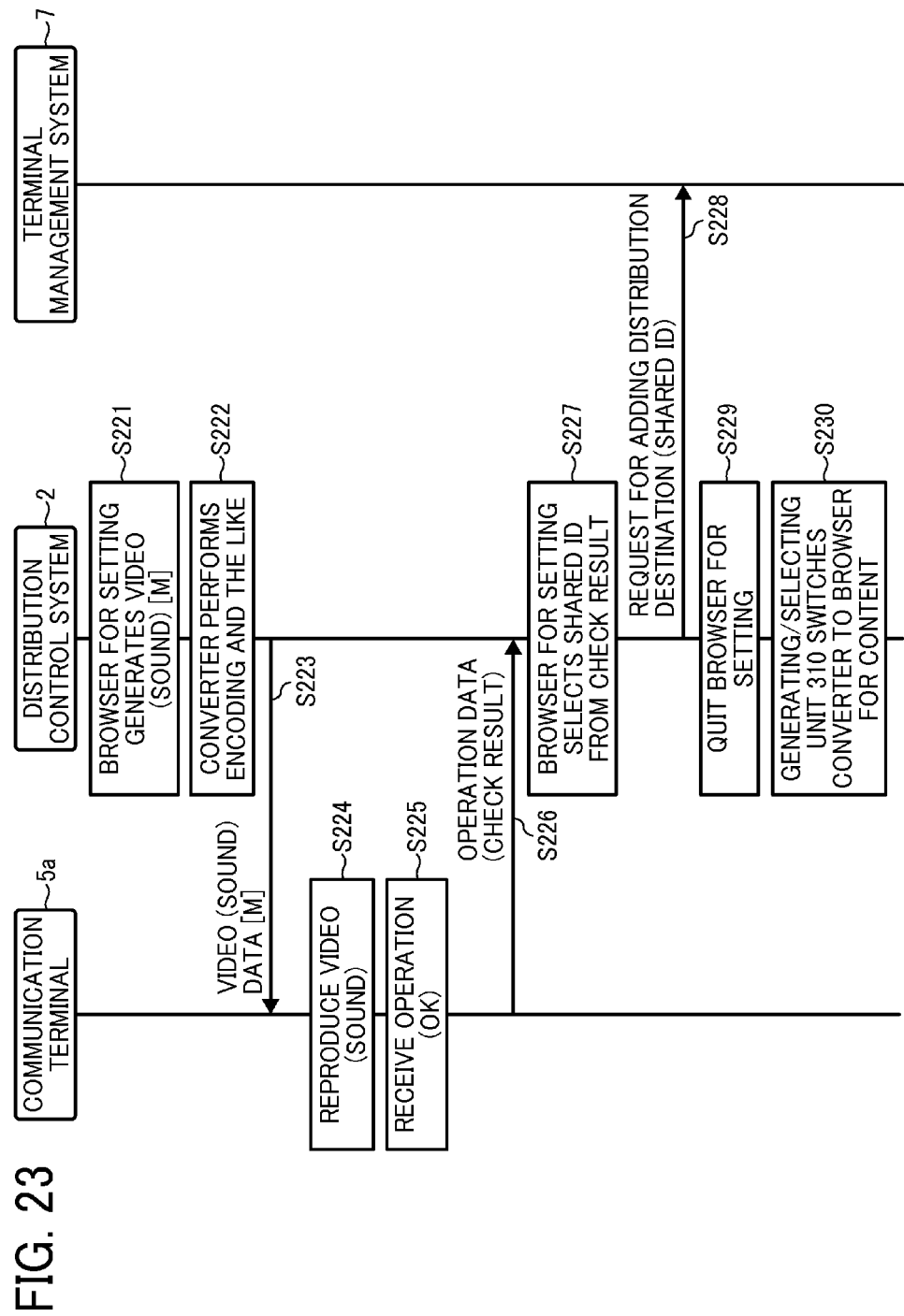
FIG. 23 is a sequence diagram illustrating the processing of multi-display as an embodiment of the present invention.
Figure 24:
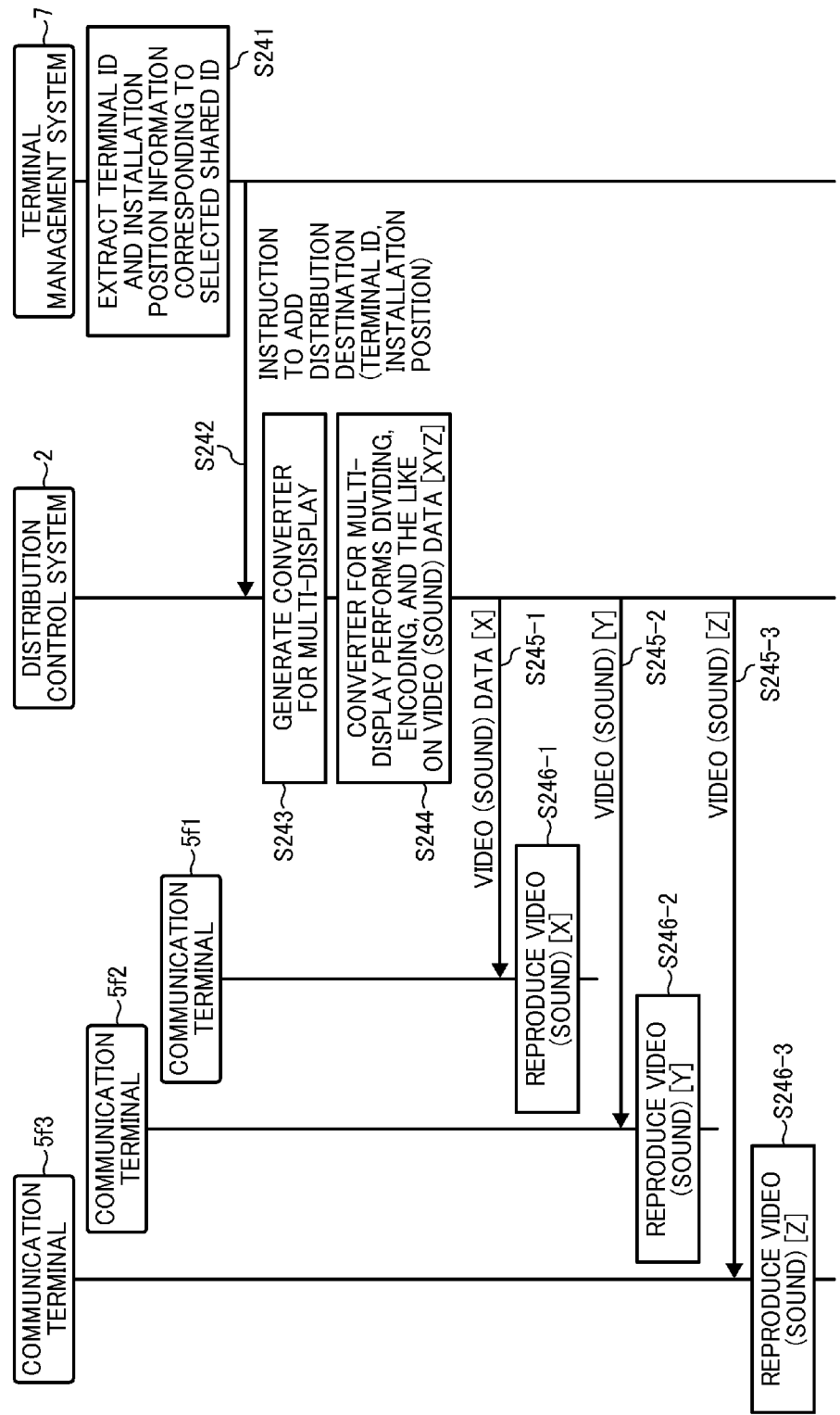
FIG. 24 is a sequence diagram illustrating the processing of multi-display as an embodiment of the present invention.

Described next with reference to FIG. 22 to FIG. 24 is the processing of multi-display. FIG. 22 to FIG. 24 are sequence diagrams illustrating the processing of multi-display illustrated in FIG. 5.

Described here, in case of reproducing video (sound) [XYZ] on the communication terminal 5a, is an example of reproducing video part of the video (sound) [XYZ] on the communication terminals (5/1, 5/2, and 5/3) in a divided manner.

Hereinafter, in describing the process of the multi-display "image (sound)" indicates data that includes image data at least.

The browser 20 for displaying web content is represented as a "browser 20a", and the browser 20 for displaying a setting screen for a user is represented as a "browser 20b". Described first is processing corresponding to S30 in FIG. 17.

First, the browser 20a of the distribution management system 2 renders the web content data [XYZ] acquired from the web server 8, thereby generating image (sound) data and outputs it to the transmission FIFO 24 (S201). The converter 10 encodes the image (sound) data stored in the transmission FIFO 24, thereby converting it into video (sound) data [XYZ] of a data format capable of being transmitted to the communication terminal 5*a* (S202).

The encoder bridge unit 30 transfers the video (sound) data [XYZ] to the reproduction controller 53 in the communication terminal 5*a* via the transmitter/receiver 31 and the transmitter/receiver 51 (S203). In the communication terminal 5*a*, the reproduction controller 53 outputs the video (sound) data [XYZ] to the decoding unit 50, and the video (sound) is reproduced on the display unit 58 via the rendering unit 55 (S204).

A screen displayed on the display unit 58 is switched to a menu request screen (not illustrated) by the user of the communication terminal 5*a*, and the operating unit 52 receives the pressing of a "distribution destination selection menu" (not illustrated) on the menu request screen (S205). This causes the transmitter/receiver 51 to transmit a request for switching to the distribution destination selection menu to the transmitter/receiver 71*a* of the terminal management system 7 (S206). The transmitter/receiver 71*b* transmits a browser 20*b* startup request to the browser management unit 22 of the distribution management system 2 via the transmitter/receiver 21 (S207).

The generating/selecting unit 310 of the encoder bridge unit 30 switches the output from the browser 20*a* to the converter 10 (e.g., the converter 10*a*) to the output from the browser 20*b* to the converter 10 (e.g., the converter 10*b*) (S209). If the communication terminal 5*a* and another communication terminal 5 {e.g., the communication terminal 5*b*) are receiving the video (sound) data in S203 with the converter 10 (e.g., the converter 10*a*) shared, the generating/selecting unit 310 of the encoder bridge unit 30 newly generates the converter 10 (e.g., the converter 10*b*), because the other communication terminal 5 (e.g., the communication terminal 5*b*) is using the converter 10 (e.g., the converter 10*a*) for the browser 20*a*.

Next, a request for a distribution destination selection menu is issued to the storage unit 7000 in the terminal management system 7 via the transmitter/receiver 21 and the transmitter/receiver 71*b* in accordance with an instruction by the browser 20*b* (S210). In this situation, the terminal ID of the communication terminal 5*a* is also transmitted.

In response thereto, the storage unit 7000 of the terminal management system 7 searches through the available terminal management table 7020 stored in the storage unit 7000 based on the terminal ID, thereby extracting the corresponding shared ID (S211). This shared ID indicates a communication terminal 5 available for the communication terminal 5*a* to perform remote sharing processing. As illustrated in FIG. 14, because the terminal ID of the communication terminal 5*a* is "t001", the shared IDs to be extracted are "v003" and "v006".

The storage unit 7000 further searches through the terminal management table 7010 based on the extracted shared ID, thereby extracting display name information indicating the corresponding display name (S212). As illustrated in FIG. 13A, display names corresponding to the extracted shared IDs "v003" and "v006" are "Tokyo head office 10F MFP" and "Osaka exhibition hall 1F multi-display", respectively.

The storage unit 7000 transfers the distribution destination selection menu data as content data to the browser 20*b* via the transmitter/receiver 71*b* and the transmitter/receiver 21 (S213). As illustrated in FIG. 12, this distribution destination selection menu data includes check boxes, shared IDs, and display names.

As illustrated in FIG. 23, the browser 20*b* renders the content data indicating the distribution destination selection menu data [M] acquired from the terminal management system 7, thereby generating image (sound) data and outputs it to the transmission FIFO 24 (S221). The converter 10 encodes the image (sound) data [M] stored in the transmission FIFO 24, thereby converting them into video {sound) data [M] of a data format capable of being transmitted to the communication terminal 5*a* (S222).

Next, the encoder bridge unit 30 transfers the video (sound) data [M] to the reproduction controller 53 in the communication terminal 5*a* via the transmitter/receiver 31 and the transmitter/receiver 51 (S223). As a result, in the communication terminal 5*a*, the reproduction controller 53 outputs the video (sound) data [M] to the decoding unit 50, and the video (sound) shown in FIG. 12 is reproduced on the display unit 58 via the rendering unit 55 (S224).

If the check box of the shared ID "v006" is checked and the "OK" button is pressed by the user, the operating transfers the check result as operation data to the browser management unit 22 via the transmitter/receiver 51 and the transmitter/receiver 31 (S226).

The browser 20*b* selects the shared ID from the check result (S227). The browser 20*b* transmits a request for adding a distribution destination to the storage unit 7000 of the terminal management system 7 via the transmitter/receiver 21 and the transmitter/receiver 71*b* (S228). This request for adding a distribution destination includes the shared ID selected at S227. The browser 20*b* then ends its role to end (S229). This causes the generating/selecting unit 310 of the encoder bridge unit 30 to return the output from the browser 20*b* to the converter 10 to the output from the browser 20*a* to the converter 10 (S230).

As illustrated in FIG. 24, in the storage unit 7000 of the terminal management system 7, the terminal management table 7010 is searched based on the shared ID sent in S228 described above, thereby extracting the corresponding terminal ID and installation position information (S241). The storage unit 7000 (that stores the terminal management information) transmits an instruction to add a distribution destination to the browser management unit 22 (that acquires the terminal management information) via the transmitter/receiver 71*b* and the transmitter/receiver 21 (S242). This instruction to add a distribution destination includes the terminal ID and the installation position information extracted at S241. Included here are three sets of the terminal ID and the installation position information, that is, the terminal ID and the installation position information are "t006" and "left", respectively, the terminal ID and the installation position information are "t007" and "center", respectively, and the terminal ID and the installation position information are "t008" and "right", respectively.

The generating/selecting unit 310 of the encoder bridge unit 30 generates a converter 10 for multi-display (S243). In this case, the generating/selecting unit 310 of the encoder bridge unit 30 acquires the terminal ID and the installation position information from the browser management unit 22.

The dividing unit 13 of the converter 10 generated in S243 divides an image data part from the image (sound) data [XYZ] stored in the transmission FIFO 24, and the encoding unit 19 encodes each of the divided image data (sound data and each of the divided image data in case of including sound data) (S244).

The encoder bridge unit 30 transfers video (sound) data [X] to the reproduction controller 53 of the communication terminal 5/1 via the transmitter/receiver 31 and the transmitter/receiver 51 of the communication terminal 5/1 based on the terminal ID ("t006") and the installation position information ("left") (S245-1). Consequently, in the communication terminal 5/1, the reproduction controller 53 outputs the video (sound) data [X] to the decoding unit 50. After that, the speaker 61 reproduces a sound based on decoded sound data [X], and the display unit 58 reproduces video based on video data [X] acquired from the decoding unit 50 and rendered by the rendering unit 55 (S246-1).

Similarly, the encoder bridge unit 30 transfers video (sound) data [Y] to the reproduction controller 53 of the communication terminal 5/2 via the transmitter/receiver 31 and the transmitter/receiver 51 of the communication terminal 5/2 based on the terminal ID ("t007") and the installation position information ("center") (S245-2). Consequently, in the communication terminal 5/2, the reproduction controller 53 outputs the video (sound) data [Y] to the decoding unit 50. After that, the speaker 61 reproduces a sound based on decoded sound data [Y], and the display unit 58 reproduces video based on video data [Y] acquired from the decoding unit 50 and rendered by the rendering unit 55 (S246-2).

In addition, similarly, the encoder bridge unit 30 transfers video (sound) data [Z] to the reproduction controller 53 of the communication terminal 5/3 via the transmitter/receiver 31 and the transmitter/receiver 51 of the communication terminal 5/3 based on the terminal ID ("t008") and the installation position information ("right") (S245-3). Consequently, in the communication terminal 5/3, the reproduction controller 53 outputs the video (sound) data [Z] to the decoding unit 50. After that, the speaker 61 reproduces a sound based on decoded sound data [Z], and the display unit 58 reproduces video based on video data [Z] acquired from the decoding unit 50 and rendered by the rendering unit 55 (S246-3).

Scrolling and Page Turning in Multi-Display

Next, a scrolling and a page turning in multi-display are described below. The page turning and the scrolling are examples of processes performed when various operation data (operation events such as operation using the keyboard 211 and the mouse 212, etc., and strokes using the electronic pen P) are acquired from the communication terminal 5.

In the description below, description regarding the sound data is omitted for the sake of simplicity.

Figure 25A:
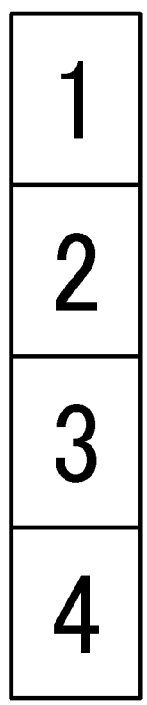
FIG. 25A is a diagram illustrating an example of content data acquired from the web server.
Figure 25B:
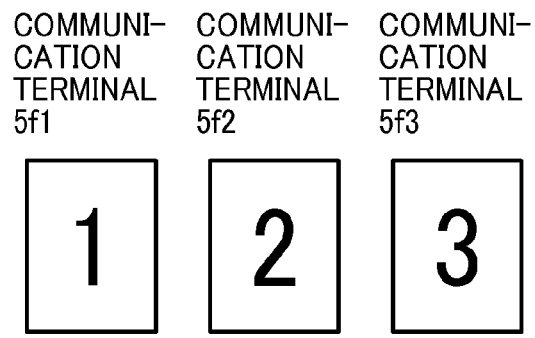
FIG. 25B is a diagram illustrating initial displays on the communication terminals.

FIG. 25A is a diagram illustrating an example of content data acquired from the web server, and FIG. 25B is a diagram illustrating initial displays on the communication terminals.

As shown in FIG. 25A, for example, the content data is consecutive data such as a document file that consists of multiple pages. In this case, the data consists of consecutive four pages.

As shown in FIG. 25B, three communication terminals (5/1, 5/2, and 5/3) are multi-display, and some of the content data is divided and distributed to each communication terminals to be displayed on each communication terminal. This division and distribution of displaying content data is determined based on the installation position information (shown in FIGS. 13A-13B) stored in the storage unit 7000.

For example, in the distribution management system 2, the first page of the content data is displayed on the communication terminal 5/1 (whose terminal ID is "t006") laid out on the left, the second page of the content data is displayed on the communication terminal 5/2 (whose terminal ID is "t007") laid out on the center, and the third page of the content data is displayed on the communication terminal 5/3 (whose terminal ID is "t008") laid out on the right. It is not always necessary to display a part of the content data (the fourth page in this case).

A different part of the content data is displayed on each of the communication terminals (5/1, 5/2, and 5/3). However, it does not matter if some part of the content data displayed on the communication terminals (5/1, 5/2, and 5/3) overlaps with some other parts.

Here, it is assumed that a drag operation using the electronic pen P or handwriting is performed on one of the communication terminals 5/1, 5/2, and 5/3 (here, 5/1 in this case). FIG. 26A is a diagram illustrating display images on the communication terminals before dragging, and FIG. 26B is a diagram illustrating display images on the communication terminals after dragging.

As shown in FIG. 26A, in case of performing the drag operation on the communication terminal 5/1 horizontally, the distribution management system 2 performs the page turning. In the page turning, display images displayed on the communication terminals (5/1, 5/2, and 5/3) are moved (modified) for one page.

For example, if the drag operation toward left (in the forward direction horizontally) is performed on the communication terminal 5/1, in the distribution management system 2, the second page of the content data is displayed on the communication terminal 5/1, the third page of the content data is displayed on the communication terminal 5/2, and the fourth page of the content data is displayed on the communication terminal 5/3. In the page turning, it is possible to move the display image for multiple pages at one time.

As shown in FIG. 26B, in case of performing the drag operation on the communication terminal 5/1 vertically, the distribution management system 2 performs the scrolling. In the scrolling, display images displayed on the communication terminals (5/1, 5/2, and 5/3) are moved (modified) in accordance with the drag amount.

For example, if the drag operation upward (in the forward direction vertically) is performed on the communication terminal 5/1 and its drag amount corresponds to about half a page, in the distribution management system 2, the latter half of the first page and the first half of the second page of the content data is displayed on the communication terminal 5/1, the latter half of the second page and the first half of the third page of the content data is displayed on the communication terminal 5/2, and the latter half of the third page and the first half of the fourth page of the content data is displayed on the communication terminal 5/3. In the page turning, it is possible to move the display image for multiple pages at one time.

As described above, in the distribution management system 2, either the page turning or the scrolling of the display image displayed on the communication terminal 5 is performed in accordance with the type of the drag operation (horizontally or vertically), and the display image displayed on the communication terminal 5 is moved in either the forward direction or the backward direction in accordance with the direction of the drag operation (in the forward direction or the backward direction). Both in the page turning and the scrolling, distance of cutout position (dividing position) of the video on the communication terminals 5 is the same.

Figure 27:
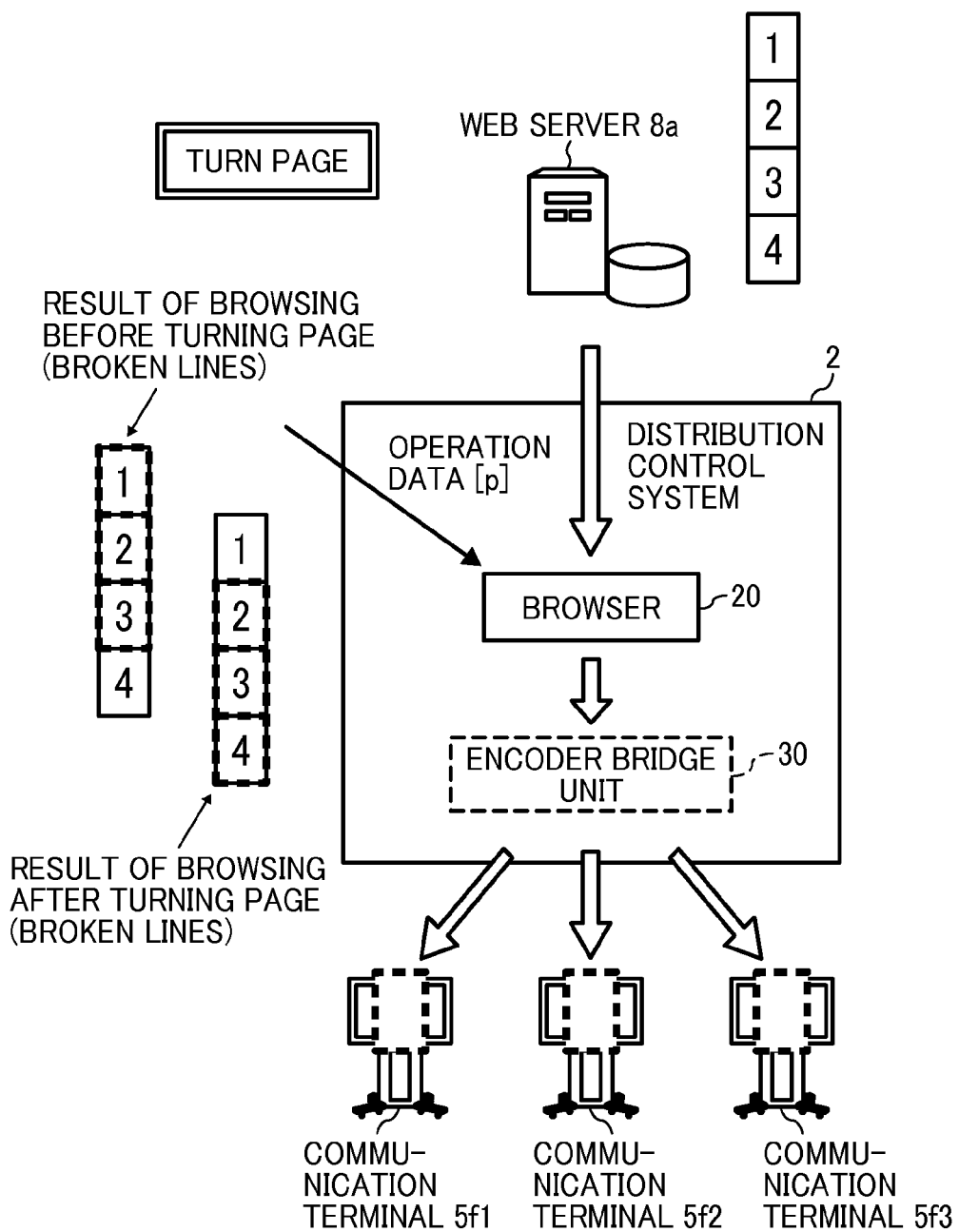
FIG. 27 is a conceptual diagram illustrating browsing content in case of turning pages.

FIG. 27 is a conceptual diagram illustrating browsing content in case of turning pages.

The browser 20 in the distribution management system 2 generates single piece of video data [1234] by rendering web content data [1234] corresponding to four pages acquired from the web server 8a. The encoder bridge unit 30 cuts video data [123] distributed to the communication terminals (5/1, 5/2, and 5/3) from the video data [1234] generated by the browser 20. Furthermore, the encoder bridge unit 30 divides the video data [123] into multiple vide data ([1], [2], and [3]) and perform encoding. Subsequently, the distribution management system 2 distributes the divided and encoded video data [1], [2], and [3] into each of communication terminals (5/1, 5/2, and 5/3). As a result, before performing the page turning, the communication terminal 5/1 displays the video [1], the communication terminal 5/2 displays the video [2], and the communication terminal 5/3 displays the video [3].

Here, it is assumed that a drag operation [p] in the horizontal forward direction (leftward) is performed on any one of the communication terminals (5/1, 5/2, and 5/3). In that case, based on the operation data [p], the encoder bridge unit 30 cuts video data [234] to be distributed to the communication terminals (5/1, 5/2, and 5/3) from the video data [1234] generated by the browser 20. Furthermore, the encoder bridge unit 30 divides the video data [234] into multiple vide data ([2], [3], and [4]) and perform encoding. Subsequently, the distribution management system 2 distributes the divided and encoded video data [2], [3], and [4] into each of communication terminals (5/1, 5/2, and 5/3).

As a result, as shown in "a browsing result after turning pages", the communication terminal 5/1 displays the video [2], the communication terminal 5/2 displays the video [3], and the communication terminal 5/3 displays the video [4]. As described above, since the video displayed on the communication terminals (5/1, 5/2, and 5/3) moves for one page only in conjunction with each other, the effect as if video displayed on the communication terminals (5/1, 5/2, and 5/3) are flipped simultaneously can be achieved.

Figure 28:
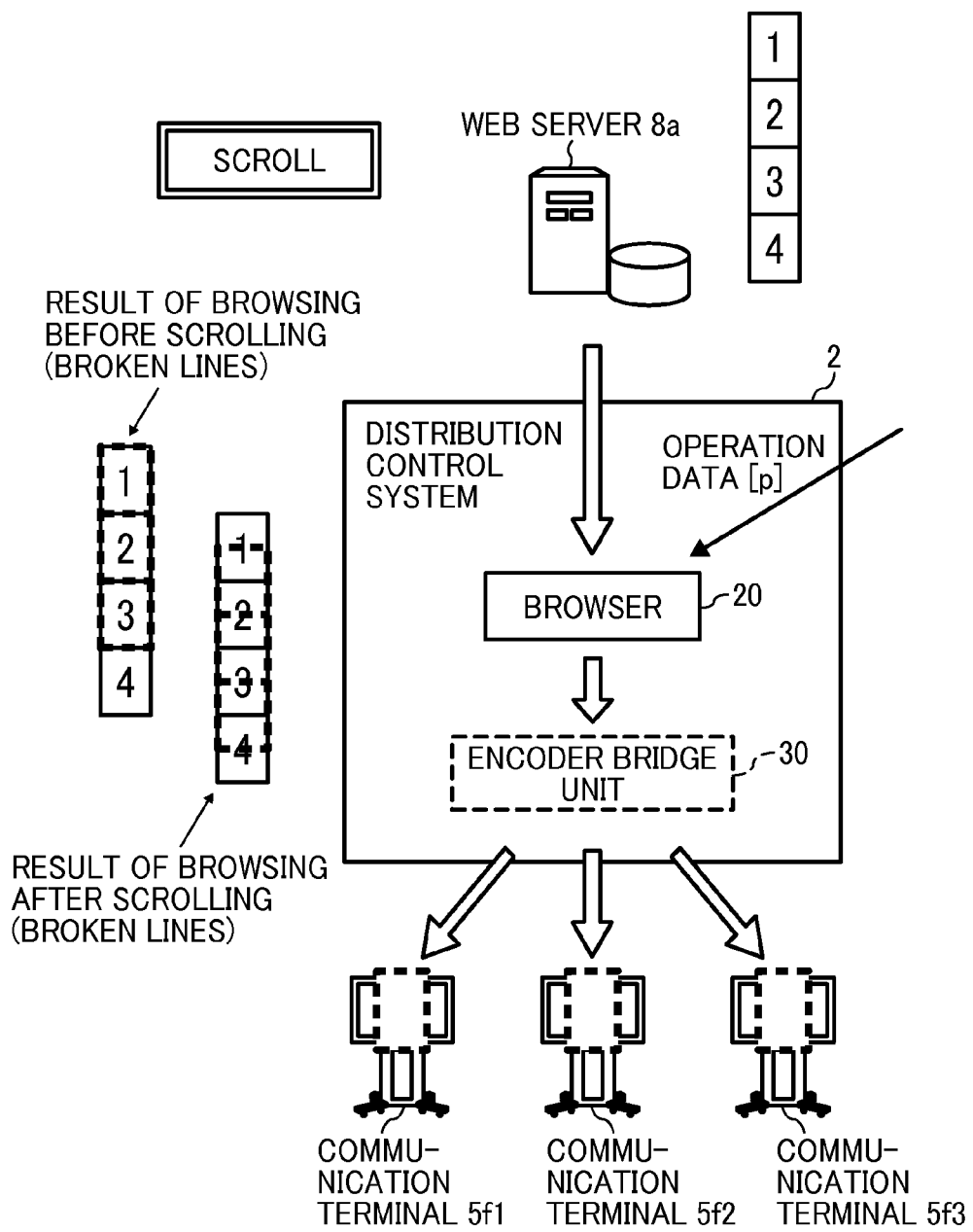
FIG. 28 is a conceptual diagram illustrating browsing content in case of scrolling pages.

FIG. 28 is a conceptual diagram illustrating browsing content in case of scrolling pages.

Just like FIG. 27, the communication terminal 5/1 displays the video [1], the communication terminal 5/2 displays the video [2], and the communication terminal 5/3 displays the video [3].

Here, it is assumed that a drag operation [p] in the vertical forward direction 2 5 (upward) is performed on any one of the communication terminals (5/1, 5/2, and 5/3). In that case, based on the operation data [p], the encoder bridge unit 30 cuts video data [1'2'3'] to be distributed to the communication terminals (5/1, 5/2, and 5/3) from the video data [1234] generated by the browser 20. Furthermore, the encoder bridge unit 30 divides the video data [1'2'3'] into multiple vide data ([1'], [2'], and [3']) and perform encoding. Subsequently, the distribution management system 2 distributes the divided and encoded video data [1'], [2'], and [3'] into each of communication terminals (5/1, 5/2, and 5/3).

As a result, as shown in "a browsing result after scrolling", the communication terminal 5/1 displays the video [1'], the communication terminal 5/2 displays the video [2'], and the communication terminal 5/3 displays the video [3']. As described above, since the video displayed on the communication terminals (5/1, 5/2, and 5/3) moves for the same amount in conjunction with each other, the effect as if video displayed on the communication terminals (5/1, 5/2, and 5/3) are scrolled simultaneously can be achieved.

Figure 29B:
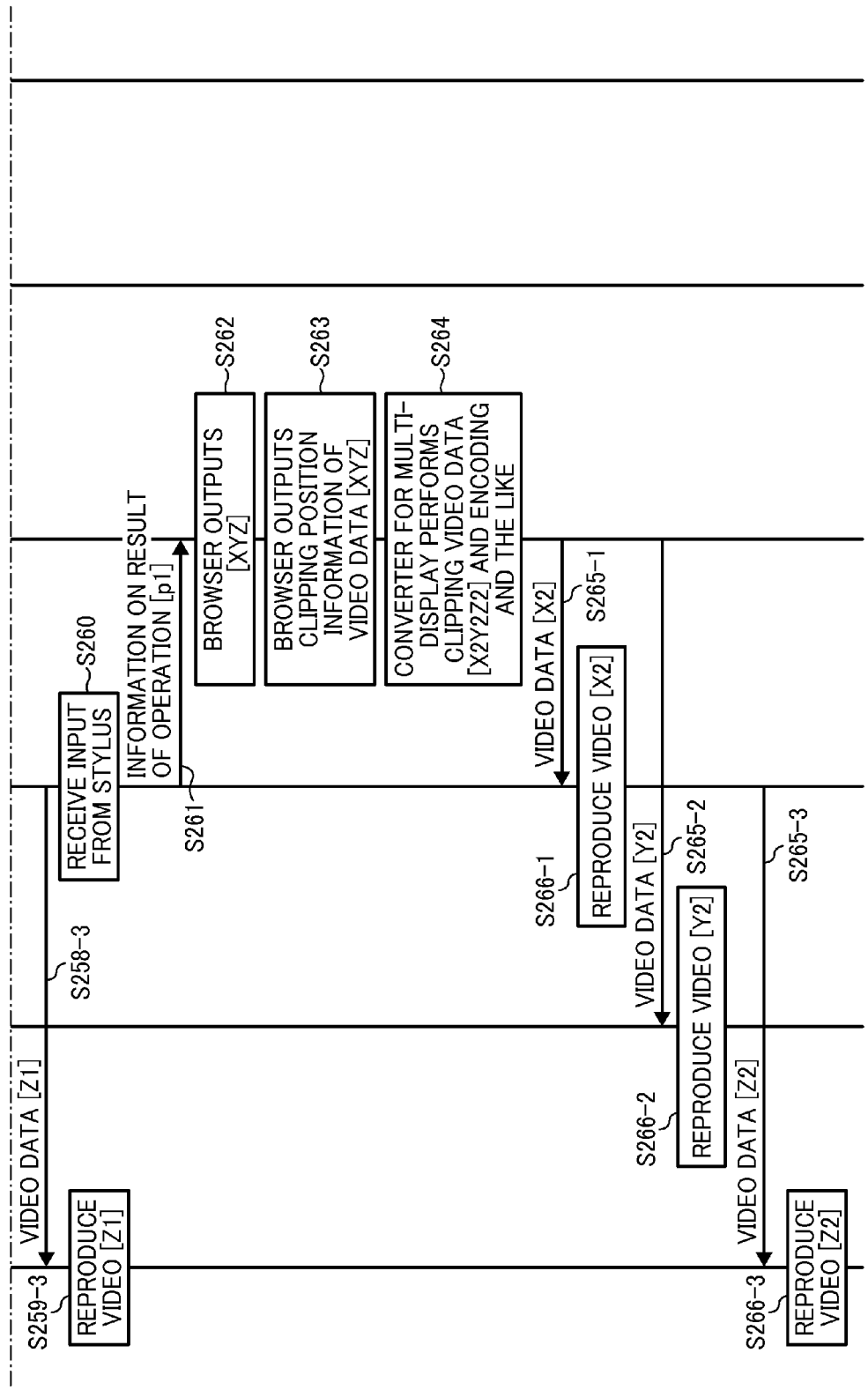

Next, a drag operation process in multi-display is described with reference to FIG. 29. FIG. 29 is a sequence diagram illustrating a process of controlling multiple displays. Here, the description starts from the process that corresponds to S243 in FIG. 24. In addition, a description regarding sound data is omitted.

First, the generating/selecting unit 310 in the encoder bridge unit 30 generates the converter 10 for multi-display in S251.

Next, the browser 20 requests the webserver 8a to send the content data [XYZ] in S252. After receiving the request, the webserver 8a reads the requested content data [XYZ] from a storage unit (not shown in figures) in the webserver 8a in S253. Subsequently, the webserver 8a sends the content data [XYZ] to the browser 20 that requested originally via the transmitter/receiver 21 in the distribution management system 2 in S254.

Next, the browser 20 renders the content data [XYZ], generates video data [XYZ], and outputs it to the transmission FIFO 24 in S255. In addition, the browser 20 stores the video data [XYZ] in the storage unit 2000 as a cache.

The browser 20 determines a cutout position (including a trimming position and dividing position) of the video data [XYZ] in accordance with layout position information (terminal management information) of the communication terminals (5/1, 5/2, and 5/3) acquired from the browser management unit 22 and outputs it as the cutout position information to the converter 10 for multi-display in S256. The browser 20 stores the cutout position information of the video data [XYZ] in the storage unit 2000 as a cache.

The converter 10 for multi-display cuts out (trims and divides) and encodes the video data [XYZ] in accordance with the cutout position information sent from the browser 20 in S257. That is, the trimming unit 11 in the converter 10 trims the video data [XYZ] stored in the transmission FIFO 24 in accordance with the cutout position information sent from the browser 20 and generates video data [X1Y1Z1]. This process deletes a part not transmitted to the communication terminals from the video data [XYZ]. Subsequently, the dividing unit 13 divides the video data [X1Y1Z1] trimmed by the trimming unit 11 into multiple pieces of video data ([X1], [Y1], and [Z1]). After that, the encoding unit 19 encodes the divided each divided video data [X1], [Y1], and [Z1].

Next, the encoder bridge unit 30 transmits the video data [X1] to the reproduction controller 53 in the communication terminal 5/1 via the transmitter/receiver 31 and the transmitter/receiver 51 in the communication terminal 5/1 based on the terminal ID and the layout position information acquired from the browser management unit 22 via the browser in S258-1. As a result, in the communication terminal 5/1, the reproduction controller 53 outputs the video data [X1] to the decoding unit 50, and the video is reproduced on the display unit 58 via the rendering unit 55 in S259-1.

Similarly, the encoder bridge unit 30 transmits the video data [Y1] to the reproduction controller 53 in the communication terminal 5/2 in S258-2. Consequently, on the communication terminal 5/2, the video is displayed on the display unit 58 in S259-2.

In addition, similarly, the encoder bridge unit 30 transmits the video data [Z1] to the reproduction controller 53 in the communication terminal 5/3 in S258-3. Consequently, on the communication terminal 5/3, the video is displayed on the display unit 58 in S259-3.

If the operating unit 52 in the communication terminal 5/1 accepts the input of the stroke operation by the electronic pen P1 in S260, the operating unit 52 sends the operation data [p1] to the browser management unit 22 in the distribution management system 2 via the transmitter/receiver 51 and the transmitter/receiver 31 in S261. Consequently the operation data [p1] is input to the browser 20 from the browser management unit 22.

If the browser 20 determines that the operation data [p1] corresponds to the drag operation data, the browser 20 reads the video data [XYZ] cached in the storage unit 2000 and outputs it to the transmission FIFO 24 in S262.

The browser 20 determines a new cutout position of the video data [XYZ] based on the operation data [p1] and outputs it as new cutout position information to the converter 10 in S263. That is, the browser 20 reads the last cutout position information cached in the storage unit 2000. If the operation data [p1] corresponds to the drag operation data that instructs turning pages, the browser 20 determines a new cutout position that the cutout position is moved for one page only (moved in units of the page). If the operation data [p1] corresponds to the drag operation data that instructs to scroll, the browser 20 determines a new cutout position that the cutout position is moved for an amount corresponding to the drag operation distance. The browser 20 outputs the determined cutout position as the new cutout position information to the converter 10 and stores it as a cache in the storage unit 2000.

In accordance with the new cutout position information acquired from the browser 20, the converter 10 for multi-display cuts out (trims and divides) and encodes the video data [XYZ] in S264. That is, the trimming unit 11 in the converter 10 trims the video data [XYZ] stored in the transmission FIFO 24 in accordance with the cutout position information sent from the browser 20 and generates video data [X2Y2Z2]. Subsequently, the dividing unit 13 in the converter 10 divides the video data [X2Y2Z2] trimmed by the trimming unit 11 into multiple pieces of video data ([X2], [Y2], and [Z2]). After that, the encoding unit 19 encodes the divided each divided video data [X2], [Y2], and [Z2].

Next, the encoder bridge unit 30 transmits the video data [X2] to the reproduction controller 53 in the communication terminal 5/1 via the transmitter/receiver 31 and the transmitter/receiver 51 in the communication terminal 5/1 based on the terminal ID and the layout position information acquired from the browser management unit 22 via the browser 20 in S265-1. As a result, in the communication terminal 5/1, the reproduction controller 53 outputs the video data [X2] to the decoding unit 50, and the video is reproduced on the display unit 58 via the rendering unit 55 in S266-1.

Similarly, the encoder bridge unit 30 transmits the video data [Y2] to the reproduction controller 53 in the communication terminal 5/2 via the transmitter/receiver 31 and the transmitter/receiver 51 in the communication terminal 5/2 based on the terminal ID and the layout position information in S265-2. Consequently, on the communication terminal 5/2, the video data [Y2] is output to the decoding unit 50 from the reproduction controller 53, and the video is displayed on the display unit 58 via the rendering unit 55 in S266-2.

In addition, similarly, the encoder bridge unit 30 transmits the video data [Z2] to the reproduction controller 53 in the communication terminal 5/3 via the transmitter/receiver 31 and the transmitter/receiver 51 in the communication terminal 5/3 based on the terminal ID and the layout position information in S265-3. Consequently, on the communication terminal 5/3, the video data [Z2] is output to the decoding unit 50 from the reproduction controller 53, and the video is displayed on the display unit 58 via the rendering unit 55 in S266-3.

In S256, it is possible that the browser 20 can associate the range of the video data ([X], [Y], and [Z]) generated by dividing with the terminal IDs that indicate the destination communication terminals (5/1, 5/2, and 5/3) using a table etc. and store it in the storage unit 2000.

In the page turning, if the cutout position and dividing position of the video data [XYZ] remain unchanged since the last distribution and only the destination communication terminal (5/1, 5/2, and 5/3) varies, the browser 20 can perform the process described below. That is, the browser 20 reads the range of the video data ([X], [Y], and [Z]) stored in the storage unit 2000 and information that indicates the corresponding terminal ID. Subsequently, the browser 20 can exchange the terminal ID in accordance with the range of the video data ([X], [Y], and [Z]) and store it in the storage unit 2000. The latter transmitter/receiver 31 distributes each of the video data [X], [Y], and [Z] to each of the communication terminals (5/1, 5/2, and 5/3).

In processing scrolling, the browser 20 can set the cutout position and the dividing position of the video data arbitrary and store it in the storage unit 2000.

Since the scrolling and the page turning in multi-display described above are performed based on the drag operation by the user, it is possible to reduce the burden on the user compared to methods such as selecting a menu.

In addition, since the scrolling or the page turning is performed based on the type of the drag operation (vertically or horizontally), it is possible to perform either scrolling or flipping the page intuitively. Furthermore, the display image is moved forward or backward in accordance with the direction of the drag operation (in the forward direction or the backward direction). In particular, if the direction of the drag operation corresponds to the moving direction of the display image, it is possible to perform scrolling and flipping the page intuitively without feeling stress.

In case of displaying content in multi-display, it is possible to perform scrolling or flipping the page cooperating displays on all communication terminals by operating any one of the communication terminals, and that can reduce the burden on user.

As described above in detail giving specific examples, in the distribution system in this embodiment, the distribution management system 2 includes the browser 20 that performs rendering and the encoder bridge unit 30 that performs encoding on the cloud environment. As a result, the browser 20 generates video (sound) data based on the content data described in predetermined description language, and the video (sound) data is distributed to the communication terminals after the encoder bridge unit 30 encodes the video (sound) data. Consequently, in the communication terminal 5, since it is possible to reduce the burden on receiving the content data described in the predetermined description language and generating the video (sound) data after receiving the data, it is possible to resolve the problem that the burden on the communication terminal 5 becomes heavy due to enrichment of content.

In particular, the browser 20 enables communication in real time, and the converter 10 encodes the video (sound) data generated by the browser 20 in real time. Therefore, for example, unlike a case in which a DVD player distributes video (sound) data not in real time (i.e., encoded preliminarily) such as on-demand distribution of video (sound) data, since the distribution management system 2 performs encoding after generating video (sound) data by rendering content acquired just before the distribution, it is possible to distribute video (sound) data in real time much better.

In the distribution system 1 in the embodiment described above, the terminal management system 7 and the distribution management system 2 are configured as different apparatuses with each other. However, for example, the distribution management system 2 can include the functions of the terminal management system 7, and the terminal management system 7 and the distribution management system 2 can be configured as a single apparatus.

The distribution management system 2 and the terminal management system 7 in the embodiment described above can be configured as either one computer or multiple computers by dividing units (functional units or storage unit) and allocating them to the computers arbitrarily.

Furthermore, storage media such as CD-ROM that stores the programs in the embodiment described above and the HDD 204 that stores those programs can be provided nationally and internationally as a program product.

The present invention also encompasses a non-transitory recording medium storing a program that executes a distribution management method. The distribution management method includes the steps of acquiring terminal management information that indicates locations of communication terminals, determining cutout position information of video data based on the terminal management information acquired by the acquisition unit and operation data received from any one of the communication terminals and modifying the cutout position information of the video data based on the operation data, cutting out multiple pieces of video data from the video data based on the cutout position information determined by the determination unit, and distributing the video data cut out by the cutout unit to each of the communication terminals based on the terminal management information.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. A distribution management apparatus, comprising:
a memory including computer executable instructions and a processor that executes the computer executable instructions and causes the distribution management apparatus to operate as
an acquisition unit configured to acquire terminal management information that indicates locations of communication terminals remote from the distribution management apparatus;
a determination unit configured to determine cutout position information of video data based on the terminal management information acquired by the acquisition unit and drag or scroll operation data received from any of the communication terminals and modify the cutout position information of the video data based on the drag or scroll operation data;
a cutout unit configured to cut out multiple pieces of video data from the video data based on the cutout position information and the drag or scroll operation data determined by the determination unit; and
a distribution unit configured to distribute different pieces of the multiple pieces of the video data cut out by the cutout unit to each of the communication terminals based on the terminal management information and the drag or scroll operation data,
wherein the determination unit is further configured to modify the cutout position information of the video data in units of viewable pages of displayable information on the communication terminals in case the drag or scroll operation data is operation data that instructs turning a viewable page of the video data displayed on one of the communication terminals, and
wherein the determination unit is further configured to modify the cutout position information of the video data displayed on the communication terminals by an amount corresponding to a drag operation distance on one of the communication terminals in case the drag or scroll operation data is operation data that instructs scrolling the video data distributed to the communication terminals based on user input.

2. The distribution management apparatus according to claim 1, wherein the cutout unit comprises:
a trimming unit configured to trim the video data based on the cutout position information determined by the determination unit by deleting a part of the data not to be transmitted to communication terminals of the distribution management apparatus; and
a dividing unit configured to divide the video data trimmed by the trimming unit into multiple pieces of video data.

3. A distribution system, comprising:
the distribution management apparatus according to claim 1; and
a storage unit to store the terminal management information provided to the acquisition unit in the distribution management apparatus.

4. A method of managing distribution, the method comprising the steps of:
acquiring terminal management information that indicates locations of communication terminals;
determining cutout position information of video data based on the terminal management information acquired by an acquisition unit and drag or scroll operation data received from any one of the communication terminals and modifying cutout position information of the video data based on the drag or scroll operation data;

cutting out multiple pieces of video data from the video data based on the cutout position information determined by a determination unit;

distributing different pieces of the multiple pieces of video data cutout by a cutout unit to each of the communication terminals based on the terminal management information and the drag or scroll operation data, wherein the determining includes modifying the cutout position information of the video data in units of viewable pages of displayable information on the communication terminals in case the drag or scroll operation data is operation data that instructs turning a page of the video data distributed to the communication terminals individually, and wherein the determining includes modifying the cutout position information of the video data displayed on the communication terminals by an amount corresponding to a drag operation distance on one of the communication terminals in case the drag or scroll operation data is operation data that instructs scrolling the video data distributed to the communication terminals based on user input.

5. The distribution management apparatus according to claim 1 wherein the distribution unit is further configured to distribute a new cutout position to each of the communication terminals based on the terminal management information.

6. The distribution management apparatus according to claim 1 wherein the terminal management information is layout position information of the communication terminals and the operation data corresponds to an instruction to move displayed data input into at least one communication terminal and received by the determination unit.

* * * * *